(12) United States Patent
Lan et al.

(10) Patent No.: US 10,805,233 B2
(45) Date of Patent: Oct. 13, 2020

(54) FRACTAL-TREE COMMUNICATION STRUCTURE AND METHOD, CONTROL APPARATUS AND INTELLIGENT CHIP

(71) Applicant: INSTITUTE OF COMPUTING TECHNOLOGY, CHINESE ACADEMY OF SCIENCES, Beijing (CN)

(72) Inventors: Huiying Lan, Beijing (CN); Tao Luo, Beijing (CN); Shaoli Liu, Beijing (CN); Shijin Zhang, Beijing (CN); Yunji Chen, Beijing (CN)

(73) Assignee: INSTITUTE OF COMPUTING TECHNOLOGY, CHINESE ACADEMY OF SCIENCE, Beijing (CN)

( * ) Notice: Subject to any disclaimer, the term of this patent is extended or adjusted under 35 U.S.C. 154(b) by 158 days.

(21) Appl. No.: 15/781,686

(22) PCT Filed: Jun. 17, 2016

(86) PCT No.: PCT/CN2016/086115
§ 371 (c)(1),
(2) Date: Jun. 5, 2018

(87) PCT Pub. No.: WO2017/107413
PCT Pub. Date: Jun. 29, 2017

(65) Prior Publication Data
US 2018/0375789 A1 Dec. 27, 2018

(30) Foreign Application Priority Data
Dec. 24, 2015 (CN) .......................... 2015 1 0983380

(51) Int. Cl.
*H04L 12/911* (2013.01)
*G06F 15/173* (2006.01)
(Continued)

(52) U.S. Cl.
CPC .......... *H04L 47/782* (2013.01); *G06F 15/173* (2013.01); *G06F 15/17306* (2013.01);
(Continued)

(58) Field of Classification Search
CPC ..... H04L 47/782; H04L 12/44; H04L 45/021; H04L 49/1515; G06F 15/173; G06F 15/17306
(Continued)

(56) References Cited

U.S. PATENT DOCUMENTS 8,629,548 B1 * 1/2014 Andreev .................. G06F 1/10
257/691
9,819,679 B1 * 11/2017 Bertz .................. H04L 63/0876
(Continued)

FOREIGN PATENT DOCUMENTS

| CN | 102025614 A | 4/2011 |
| CN | 102668473 A | 9/2012 |

(Continued)

OTHER PUBLICATIONS

Matsutani et al. "Fat H-Tree: A Cost-Efficient Tree-Based On-Chip Network," IEEE Transactions on Parallel and Distributed Systems, vol. 20, No. 8, Oct. 24, 2008 (Year: 2008).*
(Continued)

*Primary Examiner* — Kevin T Bates
*Assistant Examiner* — Chen-Liang Huang
(74) *Attorney, Agent, or Firm* — Maschoff Brennan

(57) ABSTRACT

A communication structure comprises: a central node that is a communication data center of a network-on-chip and used for broadcasting or multicasting communication data to a plurality of leaf nodes; a plurality of leaf nodes that are communication data nodes of the network-on-chip and used for transmitting the communication data to the central node; and forwarder modules for connecting the central node with
(Continued)

the plurality of leaf nodes and forwarding the communication data, wherein the plurality of leaf nodes are divided into N groups, each group having the same number of leaf nodes, the central node is individually in communication connection with each group of leaf nodes by means of the forwarder modules, the communication structure is a fractal-tree structure, the communication structure constituted by each group of leaf nodes has self-similarity, and the forwarder modules comprises a central forwarder module, leaf forwarder modules, and intermediate forwarder modules.

10 Claims, 18 Drawing Sheets

(51) Int. Cl.
*H04L 12/44* (2006.01)
*H04L 12/755* (2013.01)
*H04L 12/933* (2013.01)

(52) U.S. Cl.
CPC ............ *H04L 12/44* (2013.01); *H04L 45/021* (2013.01); *H04L 49/1515* (2013.01)

(58) Field of Classification Search
USPC .......................................................... 709/206
See application file for complete search history.

(56) References Cited

U.S. PATENT DOCUMENTS

| | | | |
|---|---|---|---|
| 2006/0109801 | A1 | 5/2006 | Ashwood Smith |
| 2015/0043575 | A1* | 2/2015 | Kumar ................... H04L 45/16 370/390 |

FOREIGN PATENT DOCUMENTS

| | | |
|---|---|---|
| CN | 103036795 A | 4/2013 |
| CN | 104335535 A | 2/2015 |
| CN | 104506310 A | 4/2015 |
| CN | 105550157 A | 5/2016 |
| CN | 105630733 A | 6/2016 |
| CN | 105634960 A | 6/2016 |

OTHER PUBLICATIONS

Matsutani et al. "Performance, Cost, and Energy Evaluation of Fat H-Tree: a Cost-Efficient Tree-Based On-Chip Network", 2007 IEEE International Parallel and Distributed Processing Symposium, Dec. 31, 2007 (Year: 2007).*

Sahu et al. "Application Mapping onto Butterfly-Fat-Tree based Network-on-Chip using Discrete Particle Swarm Optimization," International Journal of Computer Applications (0975-8887) vol. 115—No. 19, Apr. 2015 (Year: 2015).*

International Search Report dated Sep. 16, 2016, in related PCT Application No. PCT/CN2016/086115.

Matsutani, H. et al. "Performance, Cost, and Energy Evaluation of Fat H-Tree: a Cost-Efficient Tree-Based On-Chip Network", 2007 IEEE International Parallel and Distributed Processing Symposium, Dec. 31, 2007 (Dec. 31, 2007), ISSN: 1530-2075, p. 2, right column, paragraph 4 to p. 6, right column, paragraph 1, and figures 2-4 (10 pages).

Matsutani, H. et al. "Fat H-Tree: a Cost-Efficient Tree-Based On-Chip Network", IEEE Transactions on Parallel and Distributed Systems, vol. 20, No. 8, Oct. 24, 2008 (Oct. 24, 2008), ISSN: 1045-9219, p. 1128, left column, paragraph 8 to p. 1130, right column, paragraph 4, and figures 2-6 (16 pages).

Hu et al.: "A hybrid multicast routing algorithm based on hierarchical NoCs;" Journal of Harbin Engineering University, vol. 34, No. 10, Oct. 2013; pp. 1327-1333.

Yiming et al.: "A Contention-Free Test Scheduling Method Based on Path-Tree in NoC;" Journal of Computer-Aided Design & Computer Graphics, vol. 27, No. 3, Mar. 2015; pp. 533-541.

Zhou et al.: "Improved BFT Topology for Network on Chip;" Computer Systems Applications; 2011; vol. 20, No. 10; pp. 92-95.

* cited by examiner

FRACTAL-TREE COMMUNICATION STRUCTURE AND METHOD, CONTROL APPARATUS AND INTELLIGENT CHIP

TECHNICAL FIELD

The present invention relates to the technical fields of intelligent device, unmanned driving and network-on-chip data transmission, etc., and particularly relates to a fractal-tree communication structure and method, a control apparatus, and an intelligent chip for communication of a network-on-chip.

BACKGROUND

Broadcast and multicast operations are realized on a network-on-chip, wherein the network-on-chip is a new communication method of a system on chip and is a key component of the multicore technology. "Broadcast" means that the network duplicates and forwards data packages sent from a broadcast address unconditionally, and all hosts can receive all the information; "multicast" means that multicast data is only received by interfaces interested in the data package, that is, it is received by interfaces on the hosts running an application system which intends to take part in a multicast session. The available network-on-chip communication technology comprises grid-type network-on-chip and annular network-on-chip.

As shown in FIG. 1, which is a structure diagram of a grid-type network-on-chip, each tile is connected with up, down, left and right tiles, and every two adjacent tiles may transmit data to each other directly. However, such a grid-type network-on-chip structure has disadvantages of complexity in controlling broadcast and multicast, and disunity of desired delay numbers as tiles for transmitting data are different.

As shown in FIG. 2, which is a structure diagram of an annular network-on-chip, all tiles are connected to a ring, and every two adjacent tiles may transmit data to each other directly. However, such an annular network-on-chip structure has a disadvantage of longer delay in broadcasting and multicasting.

There is not an effective support to broadcast and multicast communication among multiple cores on the chip in the prior art, so it is urgent and necessary to provide a solution of low delay and small occupied area that is suitable for the broadcast communication and multicast communication simultaneously.

SUMMARY

With respect to deficiencies of the prior art, the present invention provides a fractal-tree communication structure and method, a control apparatus, and an intelligent chip.

The present invention provides a fractal-tree communication structure for communication of a network-on-chip, comprising:

a central node that is a communication data center of the network-on-chip and used for broadcasting or multicasting communication data to a plurality of leaf nodes;

a plurality of leaf nodes that are communication data nodes of the network-on-chip and used for transmitting the communication data to a central node; and forwarder modules for connecting the central node with the plurality of leaf nodes and forwarding the communication data, wherein the plurality of leaf nodes are divided into N groups, each group having the same number of leaf nodes, the central node is individually in communication connection with each group of leaf nodes via the forwarder modules, the communication structure is a fractal-tree structure, the communication structure constituted by each group of leaf nodes has self-similarity, and the forwarder modules comprise a central forwarder module, leaf forwarder modules, and intermediate forwarder modules.

As regards to the fractal-tree communication structure for communication of the network-on-chip, it may decrease the number of the forwarder modules so as to maximize sharing degree of the forwarder modules, under the circumstance of ensuring that the central node is in communication connection with each group of the leaf nodes individually.

The present invention further provides a communication method for communication of a network-on-chip using said apparatus, comprising broadcasting or multicasting communication data to the plurality of leaf nodes by means of the central node, and transmitting the communication data in the network-on-chip to the central node when received by the plurality of leaf nodes.

The communication method for a network-on-chip comprises:

when communication data is broadcasted from the central node to the plurality of leaf nodes, firstly inputting the communication data into a data cache of a central forwarder module of the central node, then transmitting the communication data in data caches of the intermediate forwarder modules sequentially, and finally inputting the communication data into data caches of leaf forwarder modules of the leaf nodes, wherein the leaf forwarder modules output the communication data to the leaf nodes in each group of leaf nodes via output ports.

The communication method for a network-on-chip comprises:

when the central node multicasts communication data to the plurality of leaf nodes, firstly inputting the communication data into a data cache of the central forwarder module of the central node, then transmitting the communication data in data caches of the intermediate forwarder modules sequentially, and finally inputting the communication data into data caches of the leaf forwarder modules in direct connection with the leaf nodes, wherein the leaf forwarder modules shift the communication data in the data caches by means of shifters, distribute communication data of preset bandwidth to each of leaf nodes, and output the communication data to the leaf nodes in each group of leaf nodes via output ports of the leaf forwarder modules.

The communication method for a network-on-chip comprises:

when the plurality of leaf nodes transmit communication data to the central node, if the leaf nodes transmit communication data of full bandwidth, firstly inputting the communication data into data caches of the leaf forwarder modules of the leaf nodes, then transmitting the communication data in data caches of the intermediate forwarder modules sequentially, and finally inputting the communication data into a data cache of the central forwarder module of the central node, wherein the central forwarder module sums up all received data transmitted from the leaf nodes by means of an adder, and outputs a result to the central node via output ports of the central forwarder module.

The communication method for a network-on-chip comprises:

when the plurality of leaf nodes transmit communication data to the central node, if the leaf nodes transmit communication data of respective preset bandwidth, firstly inputting the communication data into data caches of the leaf forwarder modules of the leaf nodes, then transmitting the communication data in data caches of the intermediate forwarder modules sequentially, and finally inputting the communication data into a data cache of the central forwarder module of the central node, wherein the central forwarder module shifts all received communication data transmitted from the leaf nodes by means of shifters according to a position of preset bandwidth of the communication data in full bandwidth, sums up all received communication data transmitted from the leaf nodes by means of an adder, and outputs a result to the central node via output ports of the central forwarder module.

The communication method for a network-on-chip comprises:

after the central forwarder module shifts all received communication data transmitted from the leaf nodes by means of shifters according to a position of preset bandwidth of the communication data in full bandwidth, setting data beyond the preset bandwidth of the communication data transmitted from each of the leaf nodes to be 0 by means of fixed logic units in the central forwarder module to execute subsequent summation operation.

The present invention further provides a control apparatus comprising one or more said communication structures connected by means of forwarder modules.

The present invention further provides an intelligent chip comprising said control apparatus.

DETAILED DESCRIPTION

Figure 1:
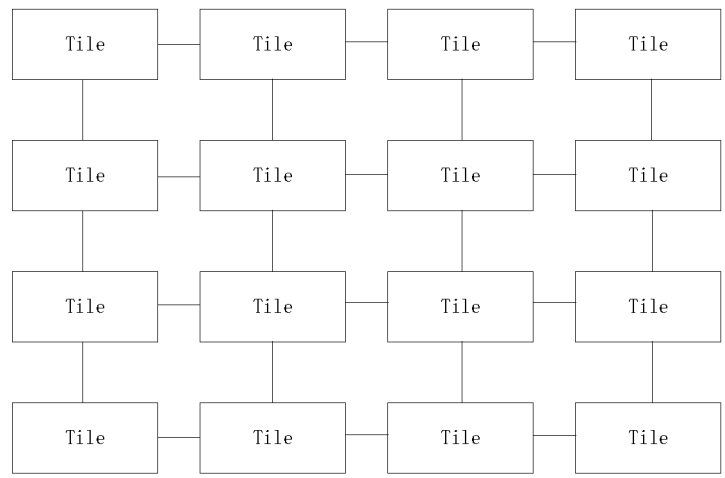
FIG. 1 is a schematic structure diagram of the grid-type network-on-chip.
Figure 2:
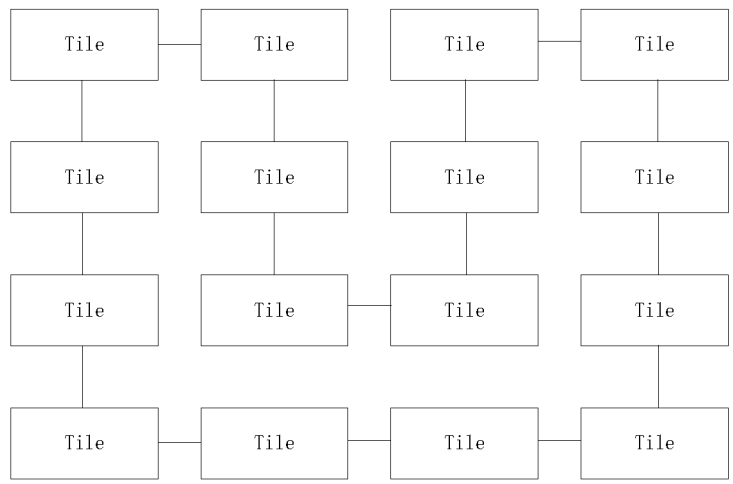
FIG. 2 is a schematic structure diagram of the annular network-on-chip.

In order to solve the above technical problem, the present invention provides a fractal-tree communication structure for a network-on-chip, comprising:

a central node that is a communication data center of the network-on-chip and used for broadcasting or multicasting communication data to a plurality of leaf nodes;

a plurality of leaf nodes that are communication data nodes of the network-on-chip and used for transmitting the communication data to the central node; and forwarder modules for connecting the central node with the plurality of leaf nodes and forwarding the communication data, wherein the plurality of leaf nodes are divided into N groups, each group having the same number of leaf nodes, the central node is individually in communication connection with each group of leaf nodes via the forwarder modules, the communication structure is a fractal-tree structure, the communication structure constituted by each group of leaf nodes has self-similarity, and the forwarder modules comprise a central forwarder module, leaf forwarder modules, and intermediate forwarder modules.

Under the circumstance of ensuring that the central node is in communication connection with each group of the leaf nodes individually, the number of the forwarder modules is decreased, such that a sharing degree of the forwarder modules is maximized.

The present invention further provides a communication method using the apparatus, comprising broadcasting or multicasting communication data to the plurality of leaf nodes by means of the central node, and transmitting the communication data in the network-on-chip to the central node when received by the plurality of leaf nodes;

when communication data is broadcasted from the central node to the plurality of leaf nodes, firstly inputting the communication data into a data cache of intermediate central forwarder module of the central node, then transmitting the communication data in data caches of the intermediate forwarder modules sequentially, and finally inputting the communication data into data caches of leaf forwarder modules of the leaf nodes, wherein the leaf forwarder modules output the communication data to the leaf nodes in each group of leaf nodes via output ports;

when the central node multicasts communication data to the plurality of leaf nodes, firstly inputting the communication data into a data cache of the central forwarder module of the central node, then transmitting the communication data in data caches of the intermediate forwarder modules sequentially, and finally inputting the communication data into data caches of the leaf forwarder modules in direct connection with the leaf nodes, wherein the leaf forwarder modules shift the communication data in the data caches by means of shifters, distributes communication data of preset bandwidth to each of leaf nodes, and output the communication data to the leaf nodes in each group of leaf nodes via output ports of the leaf forwarder modules;

when the plurality of leaf nodes transmit communication data to the central node, if the leaf nodes transmit communication data of full bandwidth, firstly inputting the communication data into data caches of the leaf forwarder modules of the leaf nodes, then transmitting the communication data in data caches of the intermediate forwarder modules sequentially, and finally inputting the communication data into a data cache of the central forwarder module of the central node, wherein the central forwarder module sums up all received data transmitted from the leaf nodes by means of an adder, and outputs a result to the central node via output ports of the central forwarder module;

when the plurality of leaf nodes transmit communication data to the central node, if the leaf nodes transmit communication data of respective preset bandwidth, firstly inputting the communication data into data caches of the leaf forwarder modules of the leaf nodes, then transmitting the communication data in data caches of the intermediate forwarder module sequentially, and finally inputting the communication data into a data cache of the central forwarder module of the central node, wherein the central forwarder module shifts all received communication data transmitted from the leaf nodes by means of shifters according to a position of preset bandwidth of the communication data in full bandwidth, sums up all received communication data transmitted from the leaf nodes by means of an adder, and outputs a result to the central node via output ports of the central forwarder module;

after the central forwarder module shifts all received communication data transmitted from the leaf nodes by means of shifters according to a position of preset bandwidth of the communication data in full bandwidth, setting data beyond the preset bandwidth of the communication data transmitted from each of the leaf nodes to be 0 by means of fixed logic units in the central forwarder module to execute subsequent summation operation.

The present invention further provides a control apparatus comprising one or more communication structures connected by means of forwarder modules.

The present invention further provides an intelligent chip comprising the control apparatus.

Below are two embodiments of the present invention, and the present invention is further explained in detail with reference to the drawings, such that those skilled in the art can carry it out according to the disclosure.

One embodiment is an apparatus in H-tree structure for communication of a network-on-chip, comprising: a central tile that is a communication data center of a network-on-chip; and a plurality of leaf tiles that are communication data nodes of the network-on-chip and in communication connection with the central tile by means of hubs, wherein the communication connection is set as follows: every two leaf tiles are set as one group, the central tile is individually in communication connection with each group of leaf tiles (which include devices relating to data operation, storage and transmission such as an arithmetic unit, a rain, a controller, etc.) by means of the hubs, and the connecting manner can achieve high efficient communication.

Figure 3:
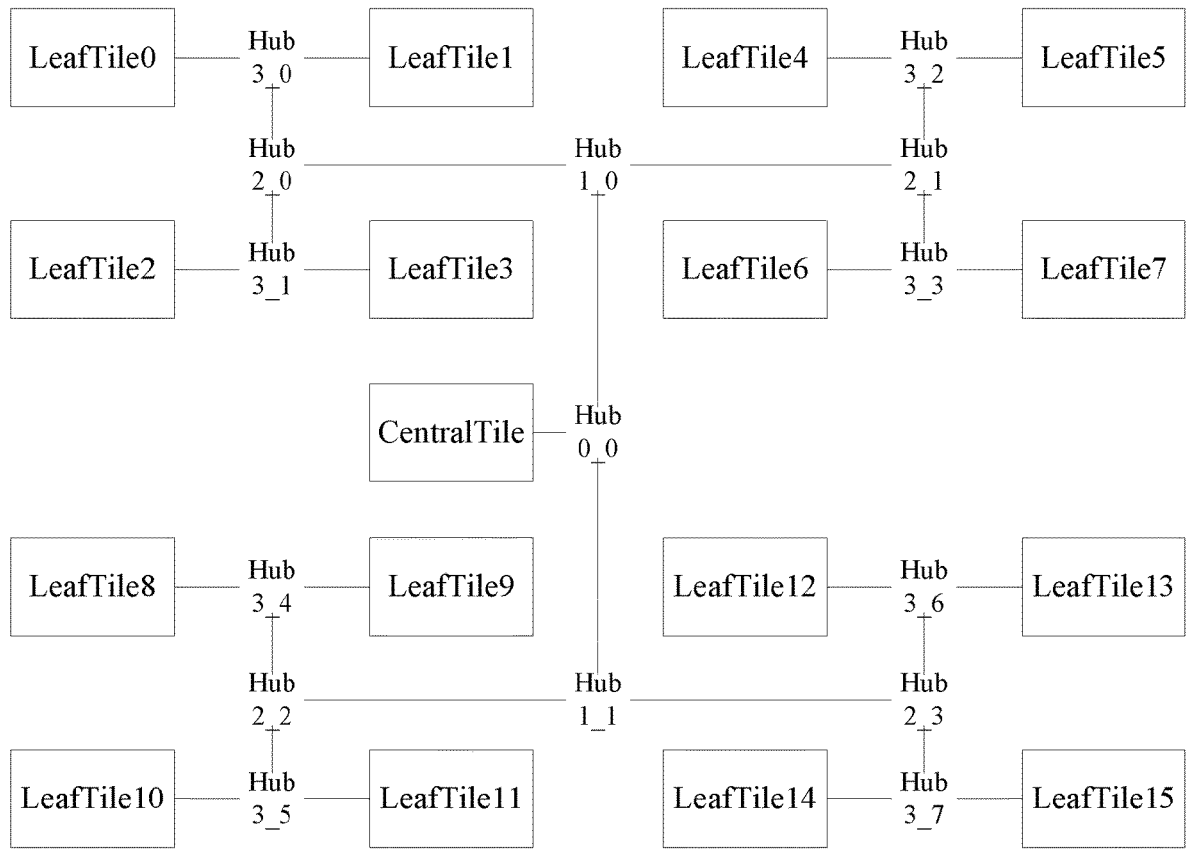
FIG. 3 is a schematic diagram of a multicore on chip structure with 16+1 cores connected using a H-tree in one embodiment of the present invention.

The number of the plurality of leaf tiles are an even number, and they use one central tile (which includes devices relating to data operation, storage and transmission such as an arithmetic unit, a rain, a controller, etc., wherein the controller is a main controller for controlling data transmission and operation of the leaf tiles). Said setting way of the nodes facilitates reducing complexity of connection, and is convenient for setting and use of the network-on-chip structure. FIG. 3 illustrates a schematic diagram of a multicore on chip structure with (16+1) cores connected by an H-tree. In this structure, sixteen leaf tiles and one central tile are connected using the H-tree structure. In addition, it further comprises a plurality of hubs for processing and distributing data, so as to transmit data from one core to multiple cores in a broadcast or multicast form, and transmit data of the multiple cores after adding or bit splicing (i.e., splicing to {leaf_tile15_data, leaf_tile14_data, . . . , leaf_tile0_data}) to one core, wherein the number, function and structure of the related body (i.e., cores to be connected) are not limited.

Figure 4:
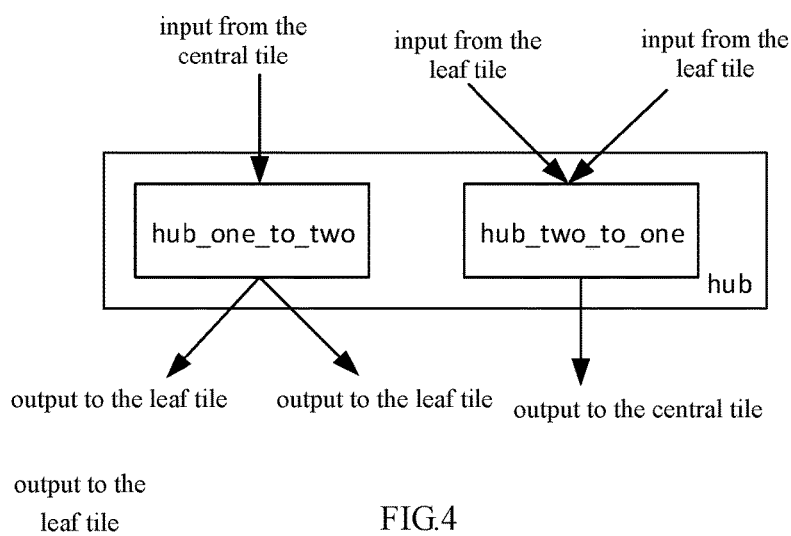
FIG. 4 is a schematic structure diagram of a hub in one embodiment of the present invention.

The communication connection is set as follows: under the circumstance of not affecting the individual communication connection of the central tile with each group of leaf tiles, a sharing degree of the hub is maximized, and the communication connection achieves effective communication to a plurality of nodes, decreases the number of hubs, and reduces complexity of the communication connection, wherein the H-tree is used for connecting respective tiles and is consisted of connecting lines and the hubs among the tiles. FIG. 4 illustrates a structure diagram of a hub. The hub is consisted of a plurality of hub_one_to_two and a plurality of hub_two_to_one, the hub_one_to_two divides one group of input into two groups of outputs for transmitting from the central tile to the leaf tiles; and the hub_two_to_one merges two groups of inputs into one group of output for transmitting from the leaf tiles to the central tile.

Figure 5:
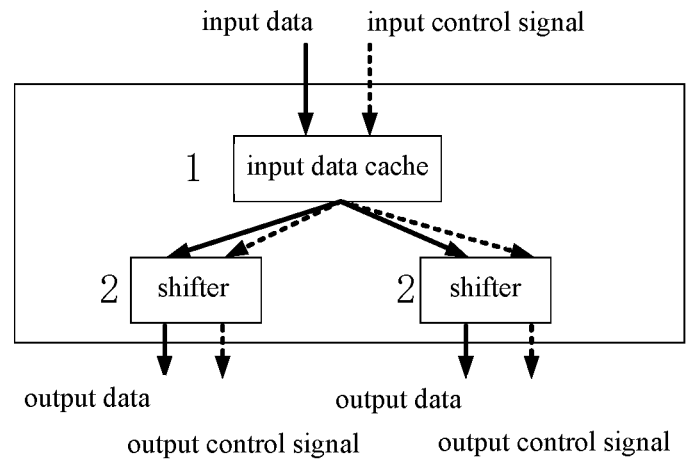
FIG. 5 is a schematic structure diagram of hub_one_to_two used in one embodiment of the present invention.

FIG. 5 illustrates a structure diagram of the hub_one_to_two. The structure is responsible for processing one group of input data and forwarding the processed data to two output ports according to control signals, and comprises: an input data cache for caching input data, and shifters for shifting the input data and generating output data according to the control signals.

Figure 6:
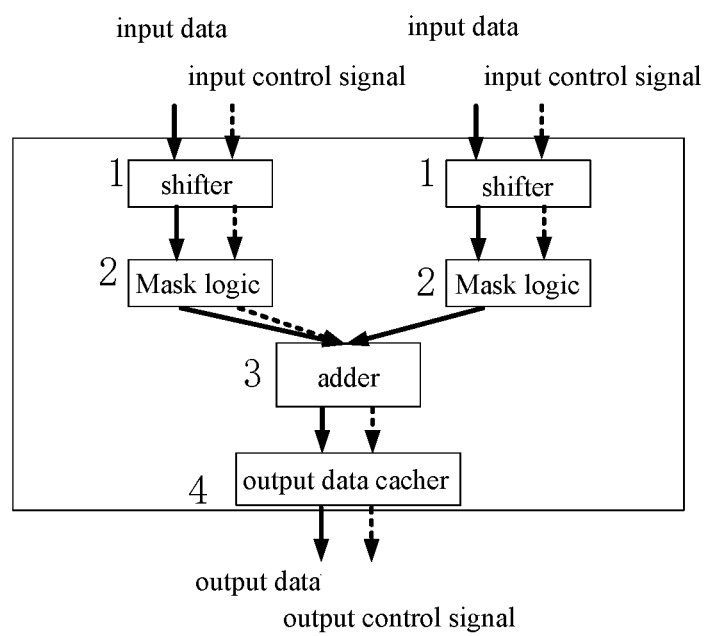
FIG. 6 is a schematic structure diagram of hub_two_to_one used in one embodiment of the present invention.

FIG. 6 is a structure diagram of the hub_two_to_one. The structure is responsible for processing two groups of input data and forwarding the processed data to one group of outputs according to control signals, and comprises: shifters for shifting the input data according to the control signals; Mask logics for generating 01 string having the same bit number as the input data according to the control signals, and performing an AND operation on the 01 string and the input data; an adder for adding the two groups of input data; and an output data cache for caching output data. A communication method of the apparatus comprises: broadcasting or multicasting from the central tile to the plurality of leaf tiles; or executing transmitting the communication data from the plurality of leaf tiles to the central tile, so as to provide a technical support for efficient broadcast or multicast.

Figure 7:
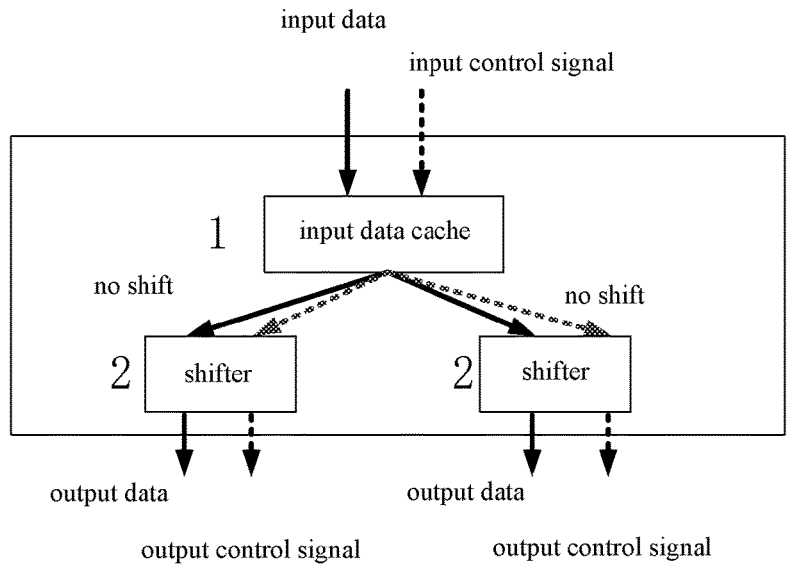
FIG. 7 is a schematic diagram of an action of the hub when transmitting from one core to multiple cores for broadcasting in one embodiment of the present invention.
Figure 8:
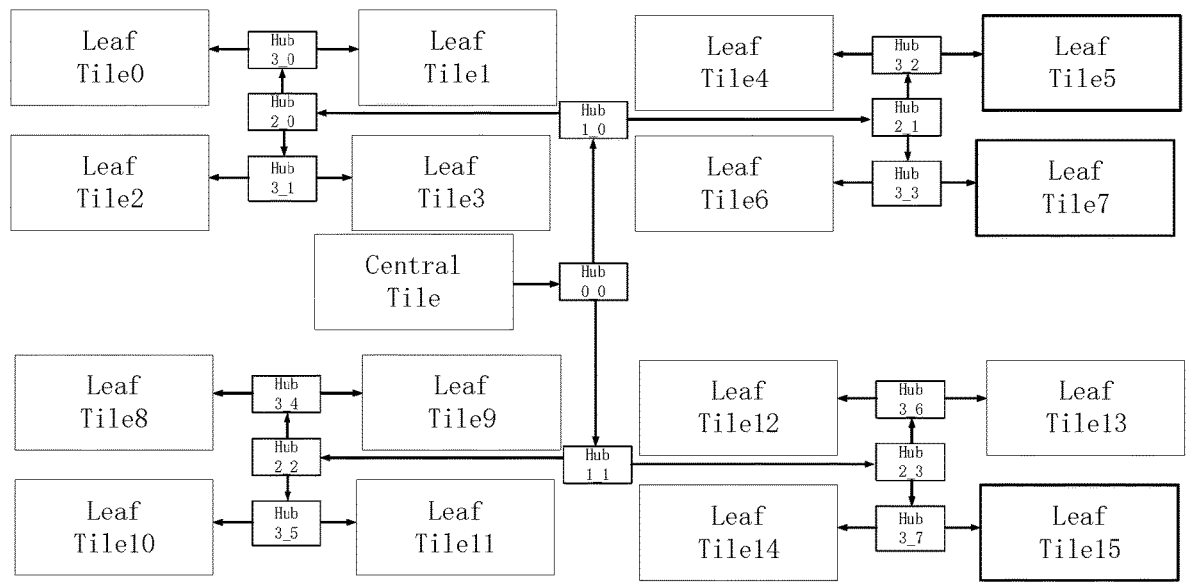
FIG. 8 is a schematic structure diagram of transmission from one core to multiple cores in one embodiment of the present invention.

When broadcasting from the central tile to the plurality of leaf tiles, the transmission manner of the communication data transmitted from the central tile on the hubs is as follows: firstly inputting into a data cache of a central hub in direct connection with the central tile, then transmitting in data caches of central hubs sequentially, and finally inputting into data caches of leaf hubs in direct connection with the leaf tiles, wherein the leaf hubs output the communication data to two leaf tiles in each group of leaf tiles via two output ports directly, so as to achieve broadcast communication via the hubs and the tiles. FIG. 7 illustrates a schematic diagram of an action of the hub when broadcasting from one core to multiple cores. Since it is one-to-two transmission, it only uses hub_one_to_two in the hubs, and control signals of hub_one_to_two in all hubs are forwarded directly, such that output data equal to input data for each hub_one_to_two. FIG. 8 illustrates a structure diagram of data transmission from one core to multiple cores in the H-tree structure. In the H-tree structure, the transmission order of data is as follows: from a central tile to a hub_0_0; from the hub_0_0 to a hub_1_$x$; from the hub_1_$x$ to a hub_2_$x$; from the hub_2_$x$ to a hub_3_$x$; and from the hub_3_$x$ to leaf tiles.

Figure 9:
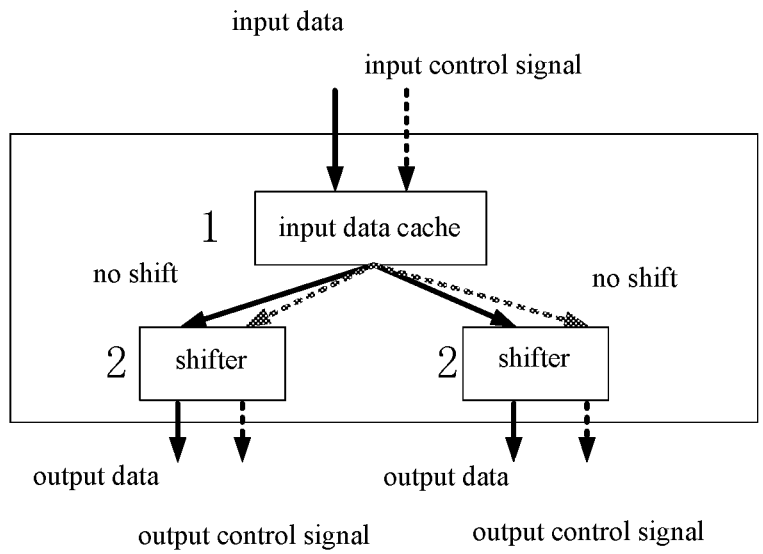
FIG. 9 is a schematic diagram of an action of the hub not in direct connection with leaf tiles when transmitting from one core to multiple cores for multicasting in one embodiment of the present invention.
Figure 10:
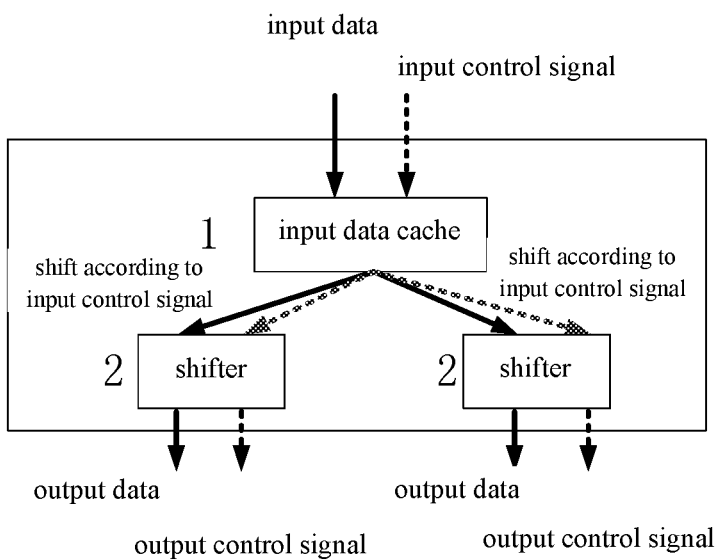
FIG. 10 is a schematic diagram of an action of the hub in direct connection with leaf tiles when transmitting from one core to multiple cores for multicasting in one embodiment of the present invention.

When multicasting from the central tile to the plurality of leaf tiles, the transmission manner of the communication data transmitted from the central tile on the hubs is as follows: firstly inputting into a data cache of a central hub in direct connection with the central tile, then transmitting in data caches of central hubs sequentially, and finally inputting into data caches of leaf hubs in direct connection with the leaf tiles, wherein the leaf hubs shift the communication data in the data caches by means of shifters, distribute communication data with preset bandwidth to each of leaf tiles, and then output to two leaf tiles in each group of leaf tiles via two output ports, so as to achieve multicast communication through the communication method. FIG. 9 illustrates a schematic diagram of an action of the hub not in direct connection with leaf tiles, and FIG. 10 illustrates a schematic diagram of an action of the hub in direct connection with leaf tiles. Control signals of hub one to two in all hubs not in direct connection with leaf tiles are forwarded directly, and control signals of hub_one_to_two in hubs in direct connection with leaf tiles are forwarded after shifting, such that in the hubs in direct connection with leaf tiles, shifting can be performed depending on data bits actually required for different leaf tiles in accordance with numbers of the leaf tiles to allow the leaf tiles to receive the desired data. In the H-tree structure, the transmission order of data is as follows: from a central tile to a hub_0_0; from the hub_0_0 to a hub_1_$x$; from the hub_1_$x$ to a hub_2_$x$; from the hub_2_$x$ to a hub_3_$x$; and from the hub_3_$x$ to leaf tiles.

Figure 11:
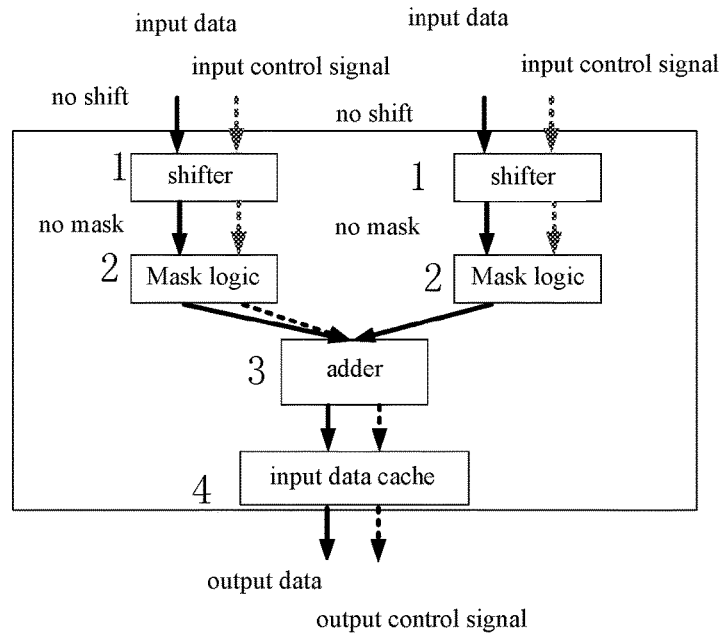
FIG. 11 is a schematic diagram of an action of the hub when outputs of the multiple cores are added, and transmitted to one core in full bandwidth in one embodiment of the present invention.
Figure 12:
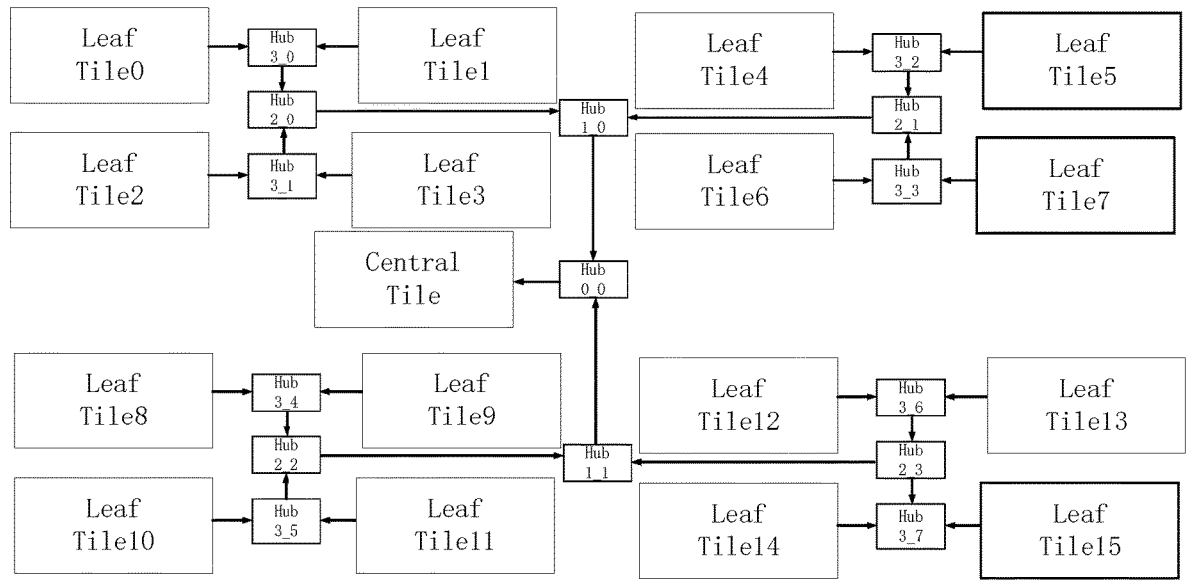
FIG. 12 is a schematic structure diagram of data transmission when outputs of the multiple cores are added, and transmitted to one core for multicasting in one embodiment of the present invention.

When transmitting communication data from the plurality of leaf tiles to the central tile, if the leaf tiles transmit full bandwidth communication data, the transmission manner of the communication data from the plurality of leaf tiles on the hubs is as follows: firstly inputting into data caches of leaf hubs in direct connection with the leaf tiles, then transmitting in data caches of central hubs sequentially, and finally inputting into a data cache of a central hub in direct connection with the central tile, wherein the central hubs sum up all received data transmitted from the leaf tiles by means of an adder, and output a result to the central tile via output ports, so as to achieve full bandwidth data communication from the plurality of leaf tiles to the central tile. FIG. 11 illustrates a schematic diagram of an action of the hub when outputs of the multiple cores are added and transmitted to one core. Since it is two-to-one transmission, it only uses hub two to one in the hubs, and control signals of hub_two_to_one in all hubs are not shifted and masked, such that output data equal to a sum of two groups of input data for each hub_two_to_one. FIG. 12 illustrates a structure diagram of multicast transmission when outputs of the multiple cores are added and transmitted to one core in the H-tree structure. In the H-tree structure, the transmission order of data is as follows: from leaf tiles to a hub_3_$x$; from the hub_3_$x$ to a hub_2_$x$; from the hub_2_$x$ to a hub_1_$x$; from the hub_1_$x$ to a hub_0_0; and from the hub_0_0 to a central tile.

Figure 13:
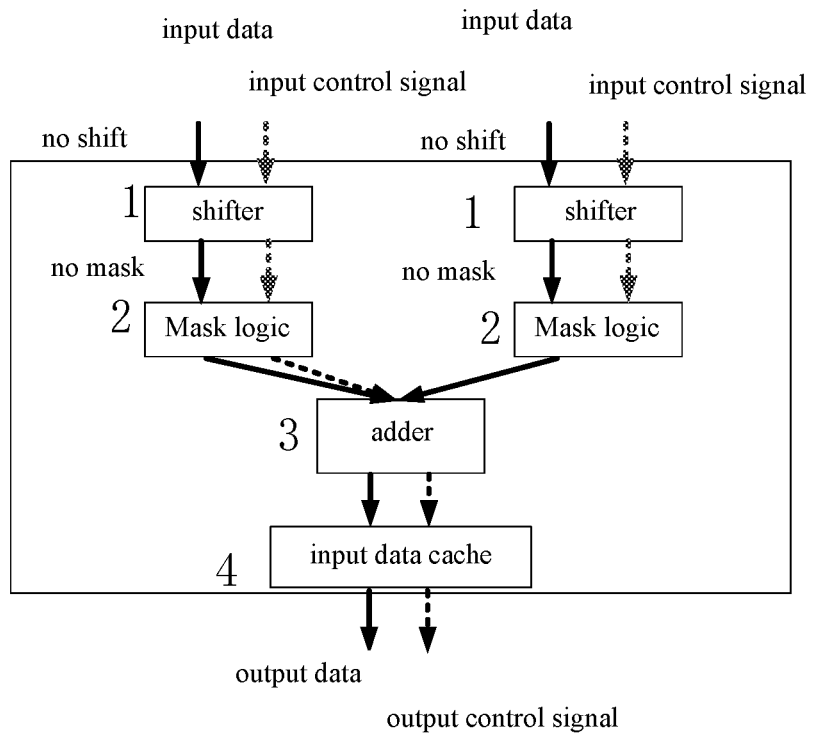
FIG. 13 is a schematic diagram of an action of the hub not in direct connection with leaf tiles when outputs of the multiple cores are bit spliced, and transmitted to one core in preset bandwidth in one embodiment of the present invention.
Figure 14:
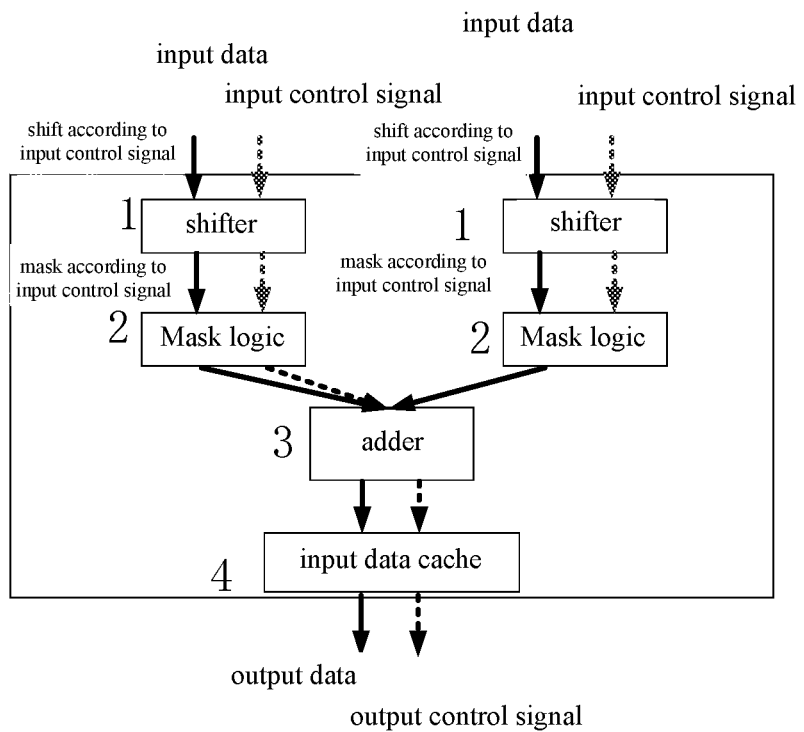
FIG. 14 is a schematic diagram of an action of the hub in direct connection with leaf tiles when outputs of the multiple cores are bit spliced, and transmitted to one core in preset bandwidth in one embodiment of the present invention.

When transmitting communication data from the plurality of leaf tiles to the central tile, if the leaf tiles transmit communication data with respective preset bandwidth, the transmission manner of the communication data from the plurality of leaf tiles on the hubs is as follows: firstly inputting into data caches of leaf hubs in direct connection with the leaf tiles, then transmitting in data caches of central hubs sequentially, and finally inputting into a data cache of a central hub in direct connection with the central tile, wherein the central hubs shift all received data transmitted from the leaf tiles by means of shifters according to a position of preset bandwidth in full bandwidth, then sum up all received data transmitted from the leaf tiles by means of an adder, and finally output a result to the central tile via output ports, so as to achieve data communication with respective preset bandwidth from the plurality of leaf tiles to the central tile. FIG. 13 illustrates a schematic diagram of an action of the hub not in direct connection with leaf tiles when outputs of the multiple cores are bit spliced and transmitted to one core, and FIG. 14 illustrates a schematic diagram of an action of the hub in direct connection with leaf tiles when outputs of the multiple cores are bit spliced and transmitted to one core. Since it is two-to-one transmission, it only uses hub_two_to_one in the hubs; control signals of hub_two_to_one in all hubs are shifted and masked according to input signals, such that output data equal to a sum of two groups of input data for each hub_two_to_one; such that shifting can be performed depending on spliced bit number resulted from splicing in accordance with numbers of the leaf tiles to shift with data bits actually required. In the H-tree structure, the transmission order of data is as follows: from leaf tiles to a hub_3_x; from the hub_3_x to a hub_2_x; from the hub_2_x to a hub_1_x; from the hub_1_x to a hub_0_0; and from the hub_0_0 to a central tile.

Another embodiment is an apparatus in X-tree structure for network-on-chip communication, comprising: a central tile that is a communication data center of a network-on-chip; and a plurality of leaf tiles that are communication data nodes of the network-on-chip and in communication connection with the central tile by means of hubs, wherein the communication connection is set as follows: every four leaf tiles are set as one group, the central tile is individually in communication connection with each group of leaf tiles (which include devices relating to data operation, storage and transmission such as an arithmetic unit, a rain, a controller, etc.) by means of the hubs, and the connecting manner can achieve efficient communication.

Figure 16:
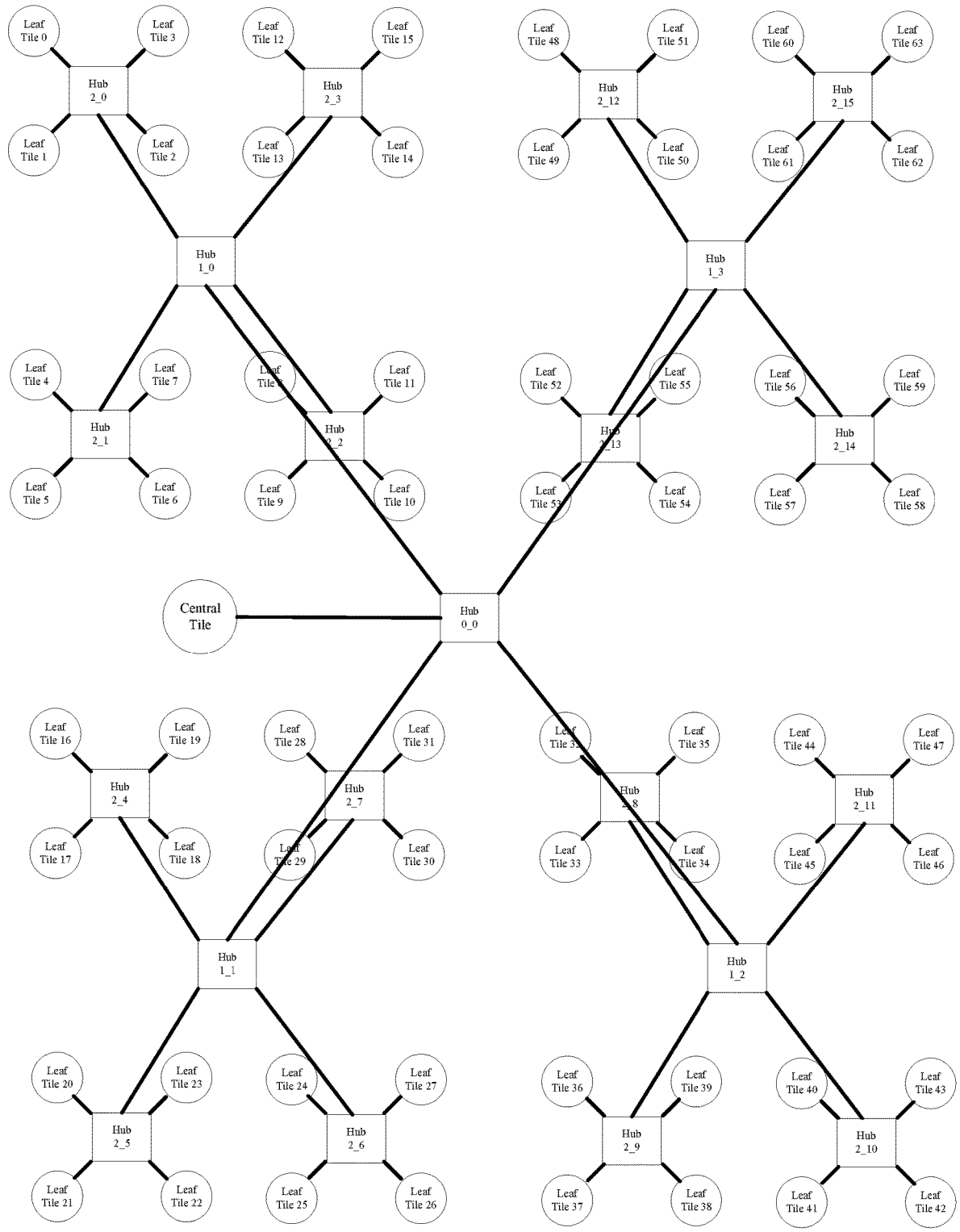
FIG. 16 is a schematic structure diagram of a multicore on chip of 16+1 cores connected using a X-tree in another embodiment of the present invention.

The communication structure is an X-tree fractal-tree structure. A communication structure constituted by each group of leaf tiles has self-similarity, i.e., it is also a X-tree structure. It uses one central tile (which includes devices relating to data operation, storage and transmission such as an arithmetic unit, a rain, a controller, etc., wherein the controller is a main controller for controlling data transmission and operation of the leaf tiles). The setting manner of the nodes facilitates reducing complexity of connection, and is convenient for setting and use of the network-on-chip structure. FIG. 16 illustrates a structure diagram of a multicore on chip with (64+1) cores connected using a X-tree, wherein sixty-four leaf tiles and one central tile are connected using the X-tree structure. In addition, it has a plurality of hubs for processing and distributing data, and realizes transmitting data from one core to multiple cores in a broadcast or multicast form, and transmitting data of the multiple cores after adding or bit splicing (i.e., splicing to {leaf_tile_63 data, leaf_tile62_data, . . . , leaf_tile0_data}) to one core, wherein the number, function and structure of the related body (i.e., cores to be connected) are not limited.

Figure 17:
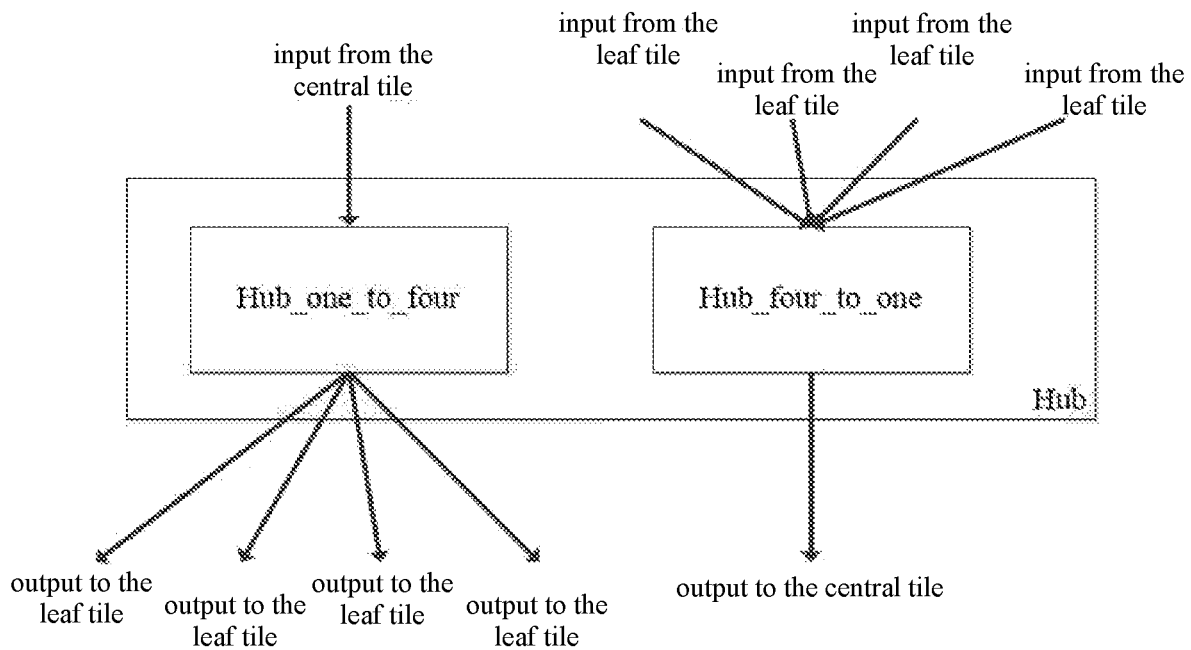
FIG. 17 is a schematic structure diagram of a Hub in another embodiment of the present invention.

The communication connection is set as follows: under the circumstance of not affecting the central tile to be individually in communication connection with each group of leaf tiles, a sharing degree of the hub is maximized, and the communication connection achieves effective communication of a plurality of nodes, decreases the number of hubs, and reduces complexity of the communication connection, wherein the H-tree is used for connecting respective tiles and is consisted of connecting lines and the hubs among the tiles. FIG. 17 illustrates a structure diagram of a hub in this embodiment. The hub is consisted of a plurality of hub_one_to_four and a plurality of hub_four_to_one, wherein the hub_one_to_four divides one group of input into four groups of outputs for transmitting from the central tile to the leaf tiles; and the hub_four_to_one merges four groups of inputs into one group of output for transmitting from the leaf tiles to the central tile.

Figure 18:
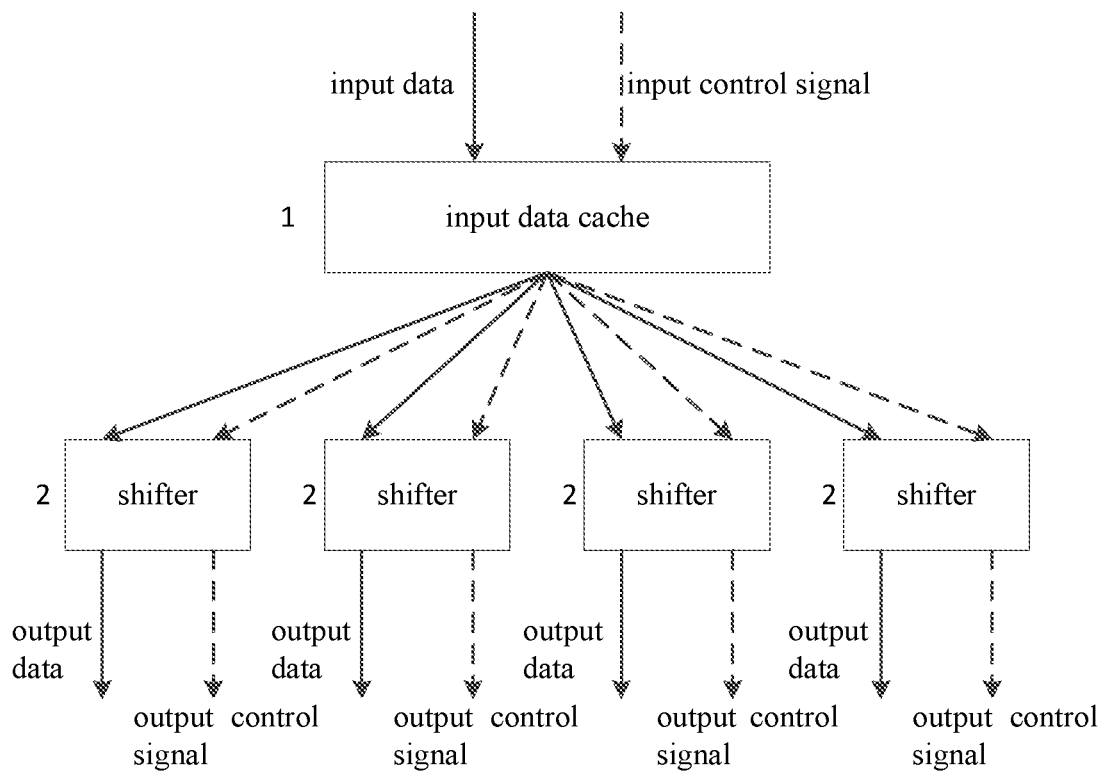
FIG. 18 is a schematic structure diagram of hub_one_to_four used in another embodiment of the present invention.

FIG. 18 illustrates a structure diagram of the hub_one_to_four. The hub_one_to_four is responsible for processing one group of input data and forwarding the processed data to four output ports according to control signals, and comprises an input data cache for caching input data; and shifters for shifting the input data according to the control signals and generating output data.

Figure 19:
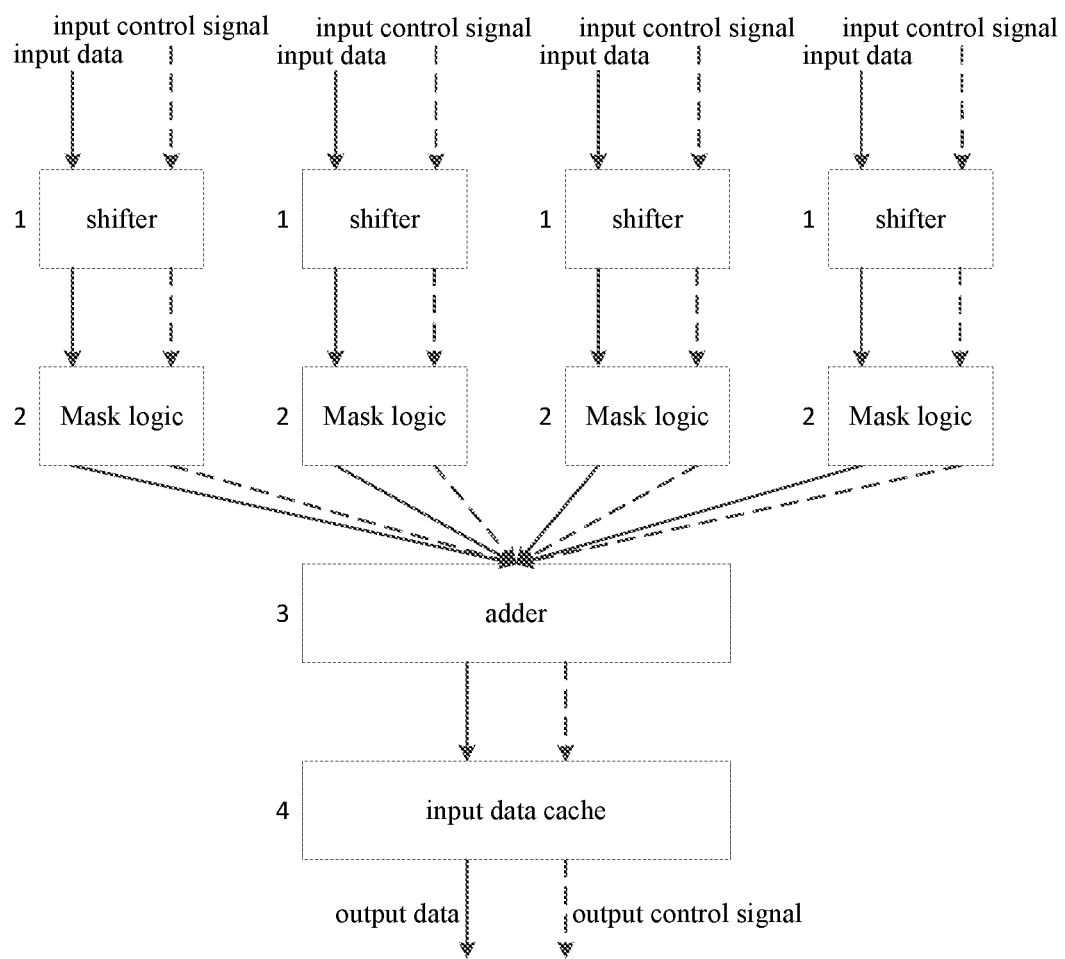
FIG. 19 is a schematic structure diagram of hub_four_to_one used in another embodiment of the present invention.

FIG. 19 illustrates a structure diagram of the hub_four_to_one. The hub_four_to_one is responsible for processing four groups of input data and forwarding the processed data to one output port according to control signals, and comprises shifters for shifting the input data according to the control signals; Mask logics for generating a 01 string having the same bit number as the input data according to the control signals, and performing an AND operation on the 01 string and the input data; an adder for adding the four groups of input data; and an output data cache for caching output data. A communication method of the apparatus comprises: broadcasting or multicasting from the central tile to the plurality of leaf tiles; or transmitting the communication data from the plurality of leaf tiles to the central tile, which provides a technical support for efficient broadcast or multicast.

Figure 20:
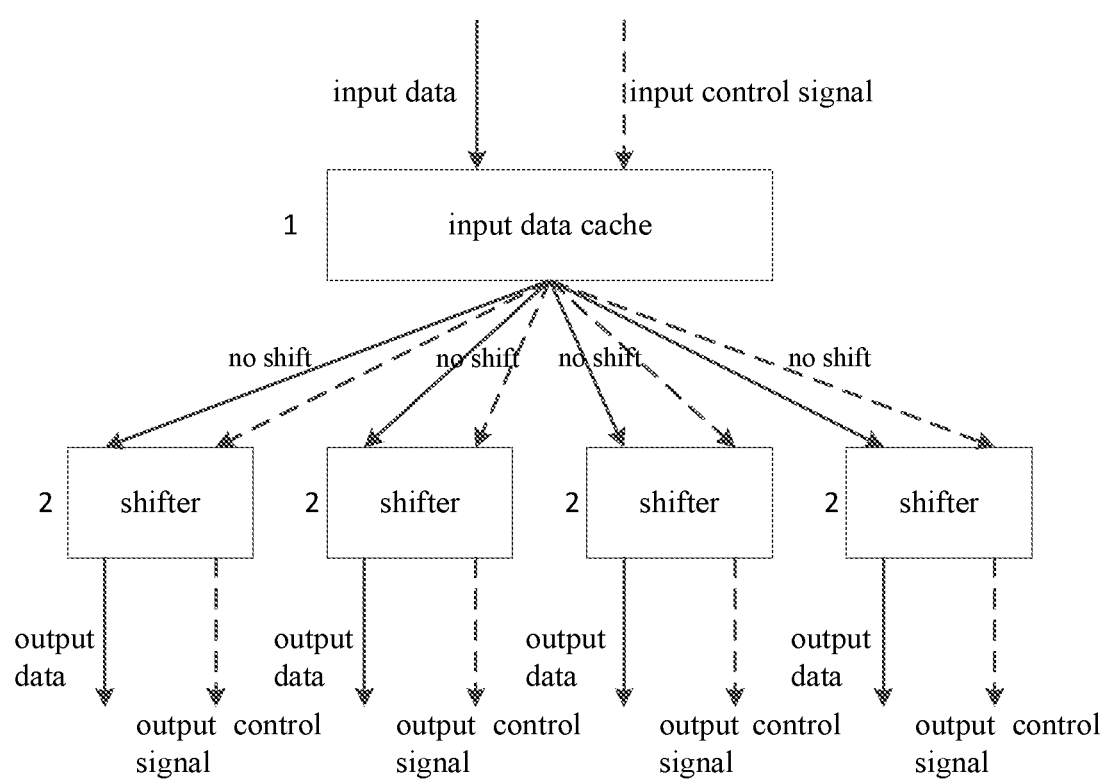
FIG. 20 is a schematic diagram of an action of the hub when transmitting from one core to multiple cores for broadcasting in another embodiment of the present invention.
Figure 21:
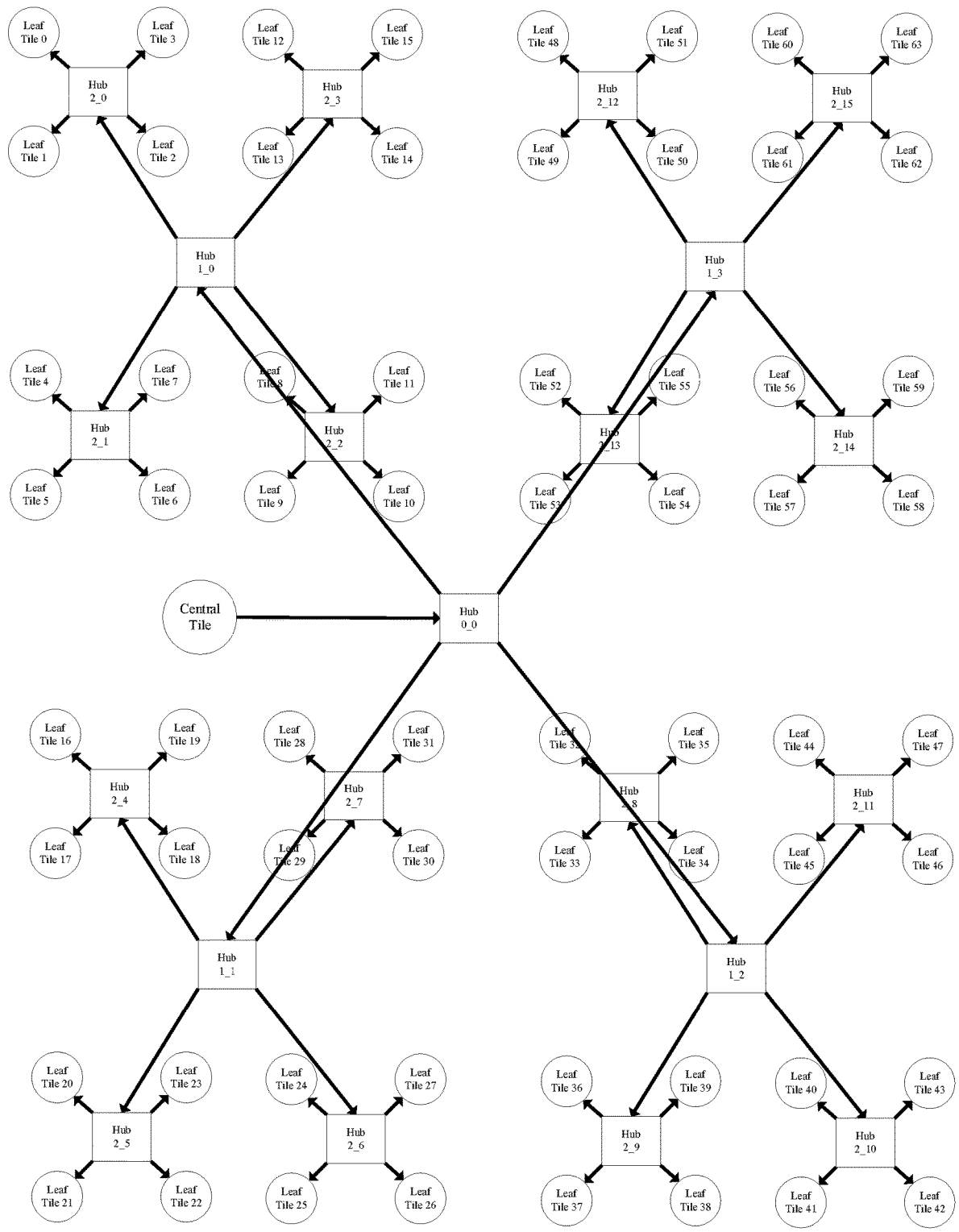
FIG. 21 is a schematic structure diagram of transmission from one core to multiple cores in another embodiment of the present invention.

When broadcasting from the central tile to the plurality of leaf tiles, the transmission manner of the communication data from the central tile on the hubs is as follows: firstly inputting into a data cache of a central hub in direct connection with the central tile, then transmitting in data caches of central hubs sequentially, and finally inputting into data caches of leaf hubs in direct connection with the leaf tiles, wherein the leaf hubs output the communication data to four leaf tiles in each group of leaf tiles via four output ports directly, so as to realize broadcast communication via the hubs and the tiles. FIG. 20 illustrates a schematic diagram of an action of the hub when broadcasting from one core to multiple cores. Since it is one-to-four transmission, it only uses hub_one_to_four in the hubs, and control signals of hub one_to_four in all hubs are forwarded directly, such that output data equal to input data for each hub_one_to_four. FIG. 21 illustrates a structure diagram of transmission from one core to multiple cores in the X-tree structure. In this structure, the transmission order of data is as follows: from a central tile to a hub_0_0; from the hub_0_0 to a hub_1_x; from the hub_1_x to a hub_2_x; and from the hub_2_x to leaf tiles.

Figure 22:
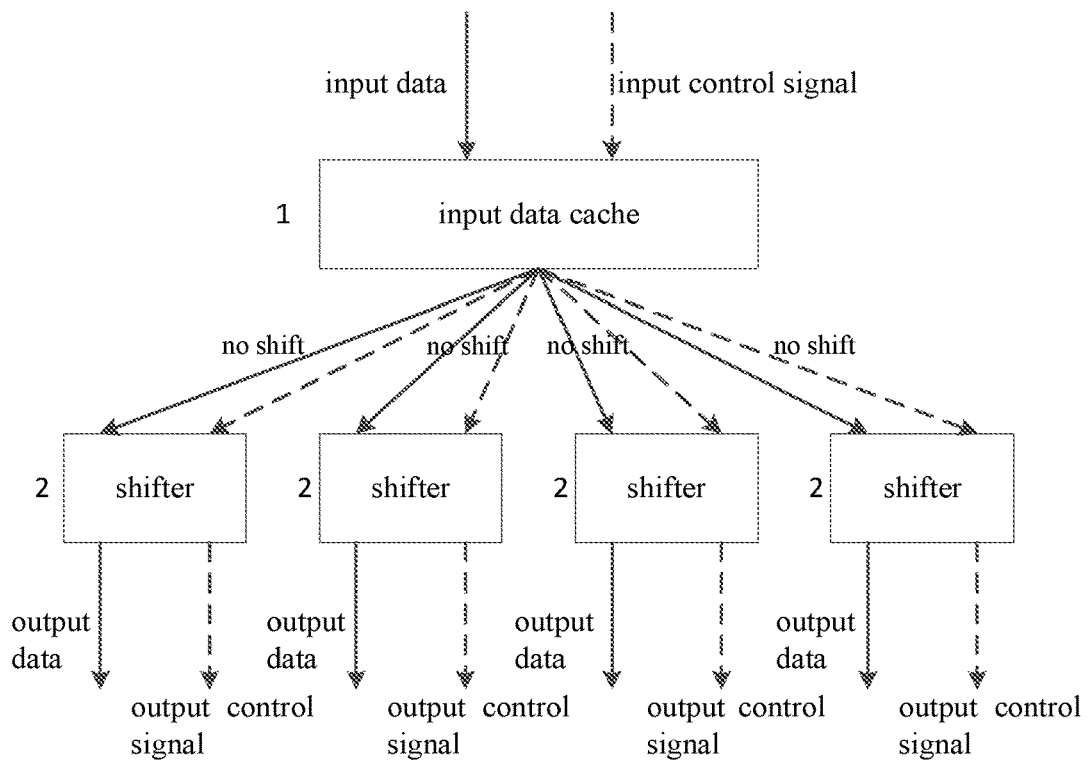
FIG. 22 is a schematic diagram of an action of the hub not in direct connection with leaf tiles when transmitting from one core to multiple cores for multicasting in another embodiment of the present invention.
Figure 23:
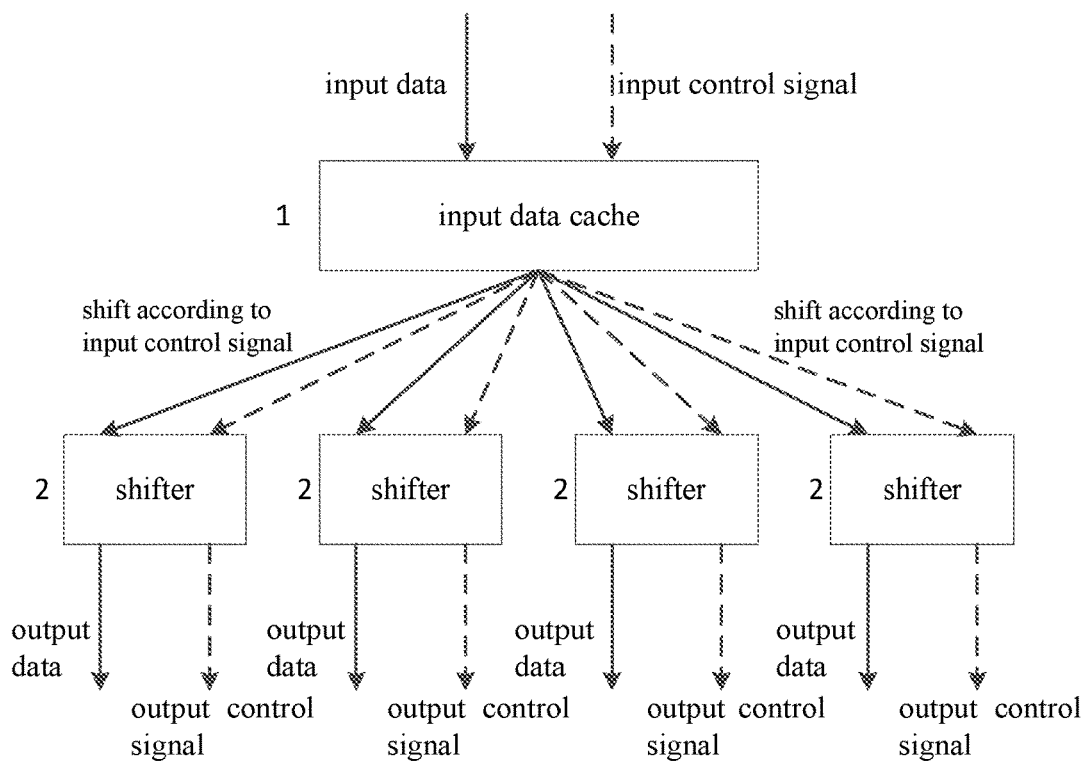
FIG. 23 is a schematic diagram of an action of the hub in direct connection with leaf tiles when transmitting from one core to multiple cores for multicasting in another embodiment of the present invention.

When multicasting from the central tile to the plurality of leaf tiles, the transmission manner of the communication data from the central tile on the hubs is as follows: firstly inputting into a data cache of a central hub in direct connection with the central tile, then transmitting in data caches of central hubs sequentially, and finally inputting into data caches of leaf hubs in direct connection with the leaf tiles, wherein the leaf hubs shift the communication data in the data caches by means of shifters, distribute preset bandwidth communication data to each of leaf tiles, and then output to four leaf tiles in each group of leaf tiles via four output ports, so as to realize multicast communication through the communication method. FIG. 22 illustrates a schematic diagram of an action of the hub not in direct connection with leaf tiles, and control signals of the shown hub_one_to_four are forwarded directly; FIG. 23 illustrates a schematic diagram of an action of the hub in direct connection with leaf tiles, and control signals of the shown hub one to four are forwarded after shifting, such that in the hubs in direct connection with leaf tiles, shifting can be performed depending on data bits actually required for different leaf tiles in accordance with numbers of the leaf tiles to allow the leaf tiles to receive the desired data. FIG. 21 illustrates a structure diagram of transmission from one core to multiple cores in a X-tree structure. In this structure, the transmission order of data is as follows: from a central tile to a hub_0_0; from the hub_0_0 to a hub_1_x; from the hub_1_x to a hub_2_x; and from the hub_2_x to leaf tiles.

Figure 24:
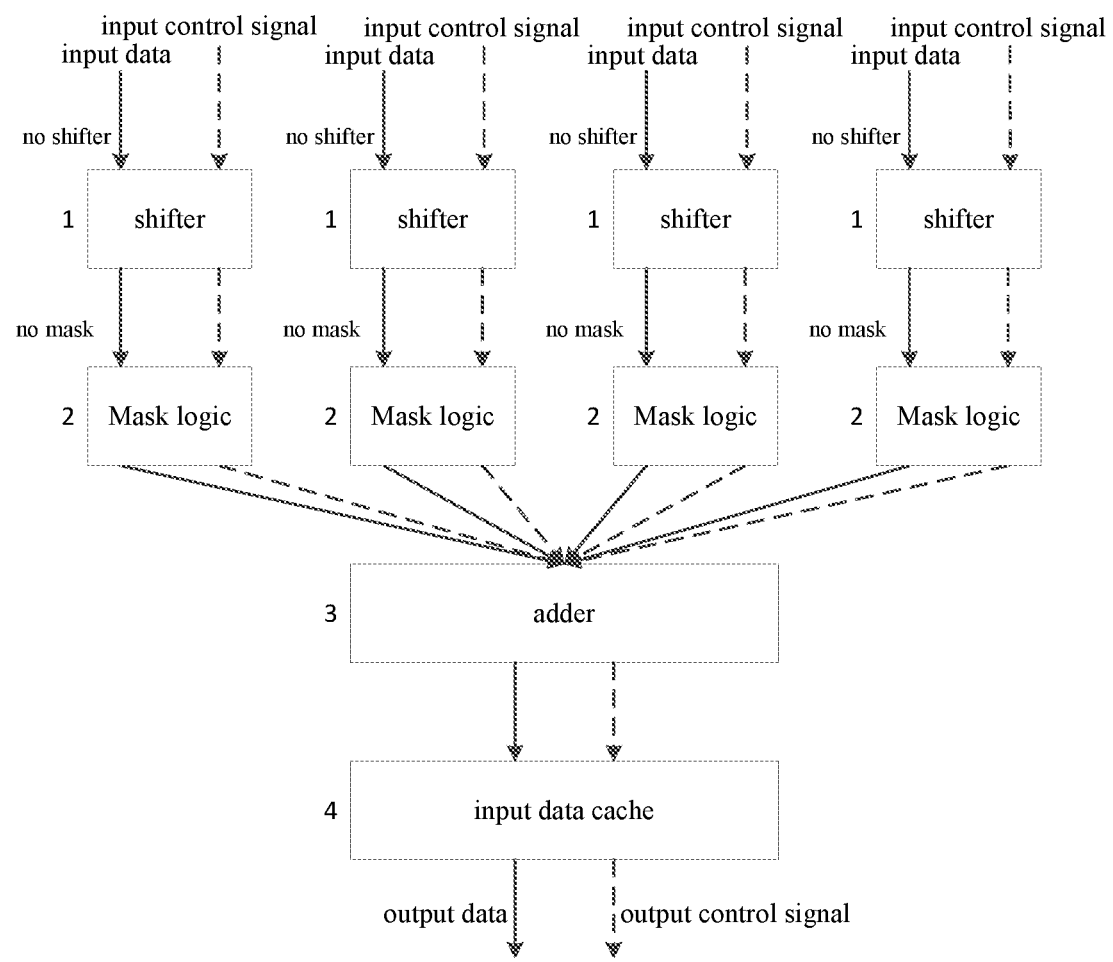
FIG. 24 is a schematic diagram of an action of the hub when outputs of the multiple cores are added, and transmitted to one core in full bandwidth in another embodiment of the present invention.
Figure 25:
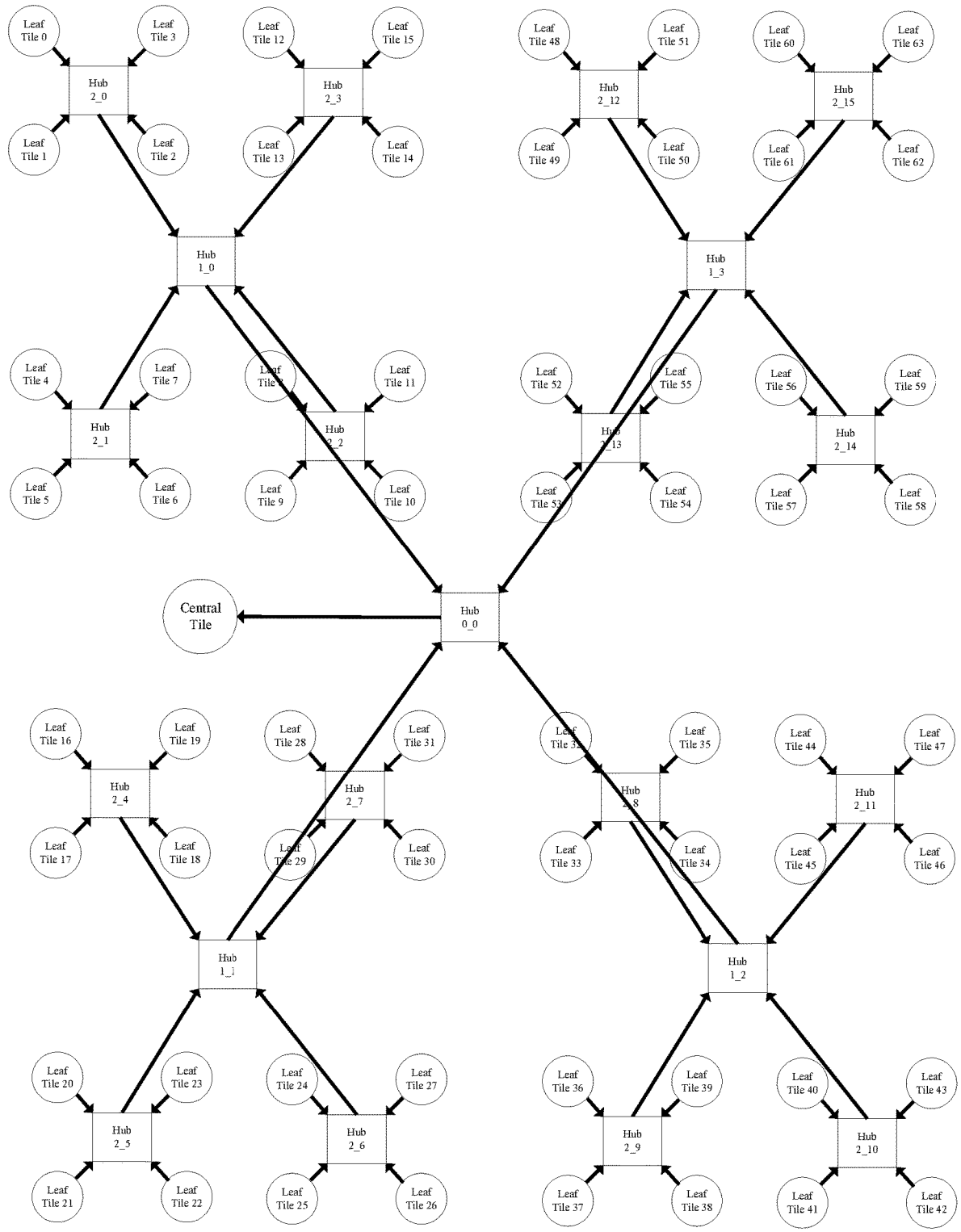
FIG. 25 is a schematic structure diagram of data transmission when outputs of the multiple cores are added, and transmitted to one core in another embodiment of the present invention.

When transmitting communication data from the plurality of leaf tiles to the central tile, if the leaf tiles transmit full bandwidth communication data, the transmission manner of the communication data from the plurality of leaf tiles on the hubs is as follows: firstly inputting into data caches of leaf hubs in direct connection with the leaf tiles, then transmitting in data caches of central hubs sequentially, and finally inputting into a data cache of a central hub in direct connection with the central tile, wherein the central hubs sum up all received data transmitted from the leaf tiles by means of an adder, and output a result to the central tile via output ports, so as to realize full bandwidth data communication from the plurality of leaf tiles to the central tile. FIG. 24 illustrates a schematic diagram of an action of the hub when outputs of the multiple cores are added and transmitted to one core. Since it is four-to-one transmission, it only uses hub_four_to_one in the hubs, and control signals of hub_four_to_one in all hubs are not shifted and masked, such that output data equal to a sum of four groups of input data for each hub_four_to one. FIG. 25 illustrates a structure diagram of transmission when outputs of the multiple cores are added and transmitted to one core in the X-tree structure. In this structure, the transmission order of data is as follows: from leaf tiles to a hub_2_x; from the hub_2_x to a hub_1_x; from the hub_1_x to a hub_0_0; and from the hub_0_0 to a central tile.

Figure 26:
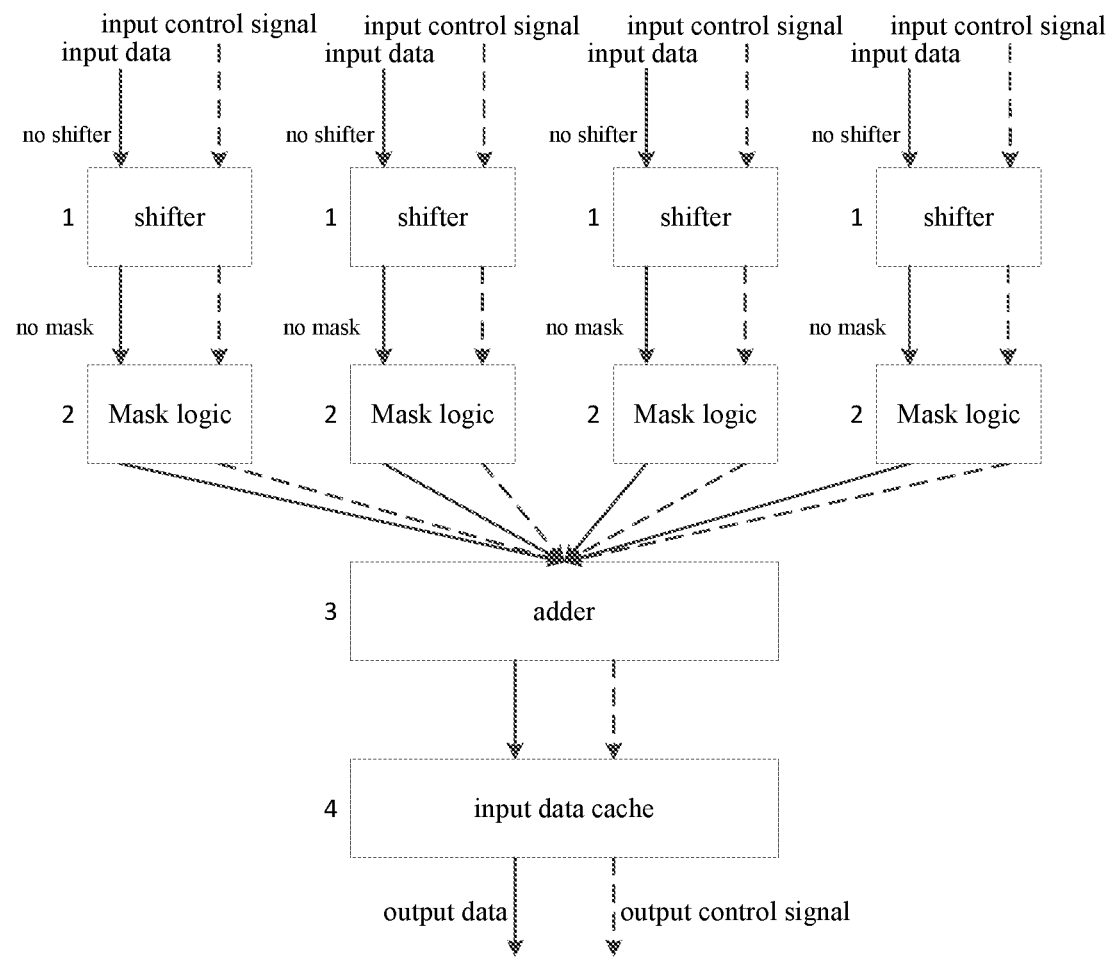
FIG. 26 is a schematic diagram of a no shift and no mask action of the hub not in direct connection with leaf tiles when outputs of the multiple cores are bit spliced, and transmitted to one core in preset bandwidth in another embodiment of the present invention.
Figure 27:
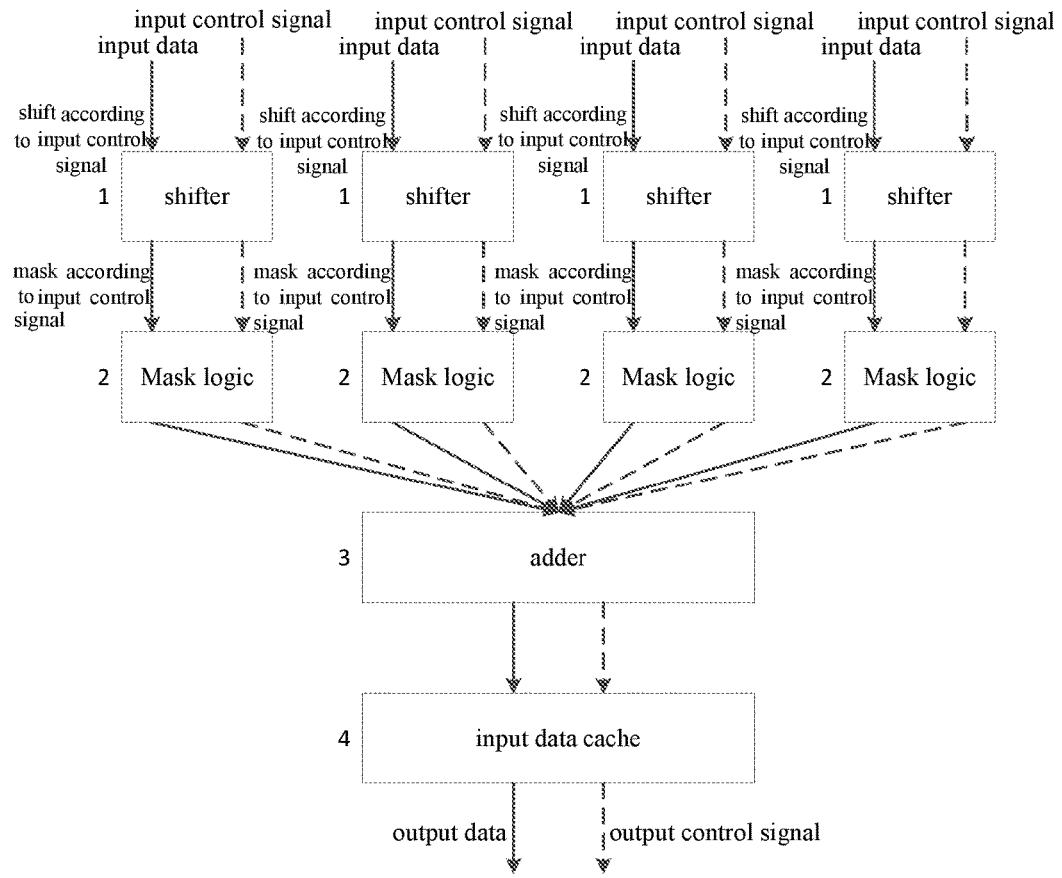
FIG. 27 is a schematic diagram of an action of the hub in direct connection with leaf tiles when outputs of the multiple cores are bit spliced, and transmitted to one core in preset bandwidth in another embodiment of the present invention.

When transmitting communication data from the plurality of leaf tiles to the central tile, if the leaf tiles transmit communication data with respective preset bandwidth, the transmission manner of the communication data from the plurality of leaf tiles on the hubs is as follows: firstly inputting into data caches of leaf hubs in direct connection with the leaf tiles, then transmitting in data caches of central hubs sequentially, and finally inputting into a data cache of a central hub in direct connection with the central tile, wherein the central hubs shift all received data transmitted from the leaf tiles by means of shifters according to a position of preset bandwidth in full bandwidth, then sum up all received data transmitted from the leaf tiles by means of an adder, and finally output a result to the central tile via output ports, so as to realize data communication with respective preset bandwidth from the plurality of leaf tiles to the central tile. Since it is four-to-one transmission, it only uses hub_four_to one in the hubs. FIG. 26 illustrates a schematic diagram of an action of the hub not in direct connection with leaf tiles when multiple outputs are bit spliced and transmitted to one core, and control signals of hub_four_to_one in all hubs are not shifted and masked, such that output data equal to a sum of four groups of input data for each hub_four_to_one. FIG. 27 illustrates a schematic diagram of an action of the hub in direct connection with leaf tiles when multiple outputs are bit spliced and transmitted to one core, and control signals of hub_four_to_one in all hubs are shifted and masked according to input signals, such that output data equal to a sum of four groups of input data for each hub_four_to_one, and shifting can be performed depending on spliced bits spliced for different leaf tiles in accordance with numbers of the leaf tiles to shift data bits actually required. FIG. 25 illustrates a structure diagram of transmission when outputs of sixty-four leaf tiles are added and transmitted to one central tile in the X-tree structure. In this X-tree structure, the transmission order of data is as follows: from leaf tiles to a hub_2_x; from the hub_2_x to a hub_1_x; from the hub_1_x to a hub_0_0; and from the hub_0_0 to a central tile.

Figure 15:
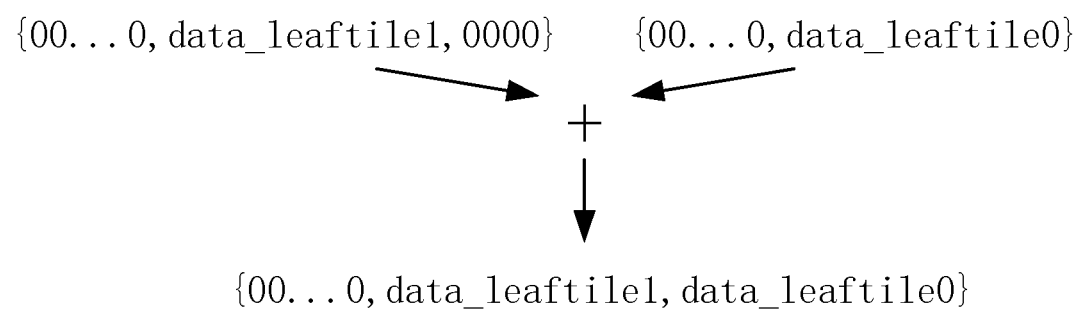
FIG. 15 is a schematic diagram of implementing bit splice in one embodiment of the present invention.
Figure 28:
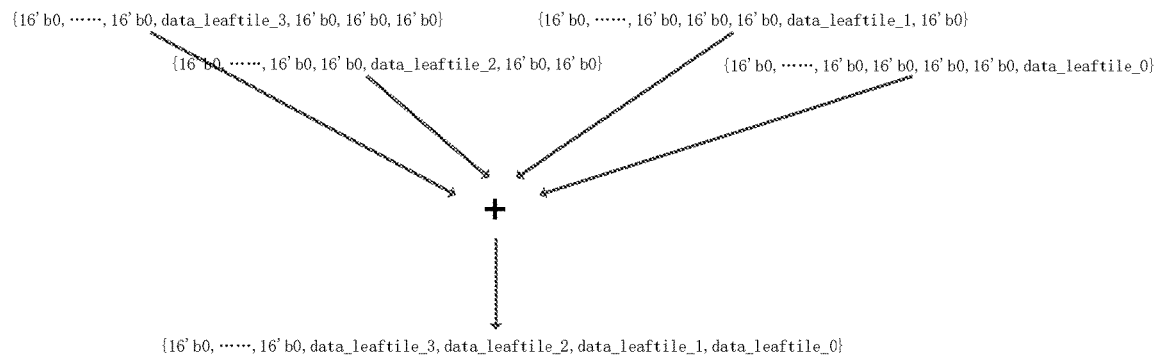
FIG. 28 is a schematic diagram of implementing bit splice in another embodiment of the present invention.

After the central hubs shift all received data transmitted from the leaf tiles by means of shifters according to a position of preset bandwidth in full bandwidth, data beyond the preset bandwidth of the data transmitted from each of the leaf tiles are set to 0 by means of fixed logic units in the central hubs to execute subsequent summation operation, and an efficient communication mode with small occupied area is achieved. FIG. 15 illustrates the first embodiment, i.e., a schematic diagram of implementing bit splice in the H-tree structure. A bit width of input data is the same as a bit width of output spliced data, but only a part of input data is required for bit splice. In this embodiment, firstly data of the leaf tiles are shifted in the hubs in direct connection with the leaf tiles to a final position, mask at other positions is set to be 0, and two inputs are added in all hubs. FIG. 28 illustrates the second embodiment, i.e., a schematic diagram of implementing bit splice in the X-tree structure. A bit width of input data is the same as a bit width of output spliced data, but only a part of input data is required for bit splice. In this embodiment, firstly data of the leaf tiles are shifted in the hubs in direct connection with the leaf tiles to a final position, mask at other positions is set to be 0, and four inputs are added in all hubs.

The apparatus and processing scale explained here are to simplify the present invention. Applications, modifications and variations of the fractal-tree structural network-on-chip communication apparatus and communication method of the present invention are obvious for those skilled in the art.

According to the disclosure, since it provides a fractal-tree network-on-chip communication apparatus and communication method, it can achieve broadcast and multicast operations on the network-on-chip in a manner of low delay, low complexity and small occupied area, so it has a manner of low delay, low complexity and small occupied area to achieve broadcast and multicast operations on the network-on-chip, and improves broadcast communication and multicast communication efficiency to obtain a better communication effect. Although the embodiments of the present invention have been disclosed above, they are not limited to applications listed in the Description and embodiments, and they can be fully adapted to various fields suitable for the present invention. As for those skilled in the art, additional modifications can be easily achieved. Therefore, without departing from the claims and general concepts defined within the equivalent range, the present invention is not limited to specific details and examples shown and described above.

INDUSTRIAL APPLICABILITY

The present invention can realize broadcast and multicast operations on the network-on-chip in a manner of low delay, low complexity and small occupied area; can improve broadcast communication and multicast communication efficiency to obtain a better communication effect The present invention solves the problem of broadcast and multicast transmission among multiple cores on the chip in the same circuit through a fractal-tree means. Taking the H-tree structure for example, as for transmission among (n+1) cores, transmission delay has only log n cycle; and as for transmission of data having a width of n, a data width for transmitting is also only n. The present invention also solves the problem of more-to-one transmission among multiple cores on the chip in the same circuit through a fractal-tree means, Taking the H-tree structure for example, as for transmission among (n+1) cores, transmission delay has only log n cycle; and as for transmission of data having a width of n, a data width for transmitting is also only n.

What is claimed is:

1. A fractal-tree communication structure for network-on-chip, comprising:
    a central node that is a communication data center of the network-on-chip and used for broadcasting or multicasting communication data to a plurality of leaf nodes;
    a plurality of leaf nodes that are communication data nodes of the network-on-chip and used for transmitting the communication data to a central node; and
    forwarder modules for forwarding the communication data, comprising a central forwarder module, leaf forwarder modules, and intermediate forwarder modules,
    wherein the plurality of leaf nodes are divided into N groups, each group having the same number of leaf nodes, wherein leaf nodes in each group are connected to the leaf forwarder module in the respective group and leaf forwarder modules are connected to the central forwarder module via intermediate forwarder modules so that the central node is in communication connection with each group of leaf nodes by means of the forwarder modules individually, wherein the communication structure is a fractal-tree structure, and wherein the communication structure constituted by each group of leaf nodes and the respective leaf forwarder module has similarity with the communication structure constituted by the leaf forwarder modules and the respective intermediate forwarder module, and with the communication structure constituted by the intermediate forwarder modules and the central forwarder module, wherein:
        when the central node multicasts communication data to the plurality of leaf nodes, firstly inputting the communication data into a data cache of the central forwarder module corresponding to the central node, then transmitting the communication data in data caches of the intermediate forwarder modules sequentially, and finally inputting the communication data into data caches of the leaf forwarder modules in direct connection with the leaf nodes, wherein the leaf forwarder modules shift the communication data in the data cache by means of shifters, distribute communication data with a preset bandwidth to each of leaf nodes so that only a certain preset bit range within the communication data is used, and output the communication data to the leaf nodes in each group of leaf nodes via output ports of the leaf forwarder modules, or
        when the plurality of leaf nodes transmit communication data to the central node, if the leaf nodes transmit full bandwidth communication data, firstly inputting the communication data into data caches of the leaf forwarder modules corresponding to the respective leaf nodes, then transmitting the communication data in data caches of the intermediate forwarder modules sequentially, and finally inputting the communication data into a data cache of the central forwarder module corresponding to the central node, wherein the central forwarder module sums up all received data transmitted from the leaf nodes by means of an adder, and outputs a result to the central node via output port of the central forwarder module, or
        when the plurality of leaf nodes transmit communication data to the central node, if the leaf nodes transmit communication data with respective preset bandwidth, firstly inputting the communication data into data caches of the leaf forwarder modules corresponding to the respective leaf nodes, then transmitting the communication data in data caches of the intermediate forwarder modules sequentially, and finally inputting the communication data into a data cache of the central forwarder module corresponding to the central node, wherein the central forwarder module shifts all received communication data transmitted from the leaf nodes by means of shifters according to a position of the preset bandwidth in full bandwidth, sums up all received communication data transmitted from the leaf nodes by means of an adder, and outputs a result to the central node via output port of the central forwarder module.

2. The fractal-tree communication structure for network-on-chip according to claim 1, wherein under the circumstance of ensuring that the central node is in communication connection with each group of the leaf nodes individually, the number of the forwarder modules is decreased, such that a sharing degree of the forwarder modules is maximized.

3. A communication method for a fractal-tree communication structure for network-on-chip the fractal-tree communication structure comprising:
    a central node that is a communication data center of the network-on-chip and used for broadcasting or multicasting communication data to a plurality of leaf nodes;
    a plurality of leaf nodes that are communication data nodes of the network-on-chip and used for transmitting the communication data to a central node; and
    forwarder modules for forwarding the communication data, comprising a central forwarder module, leaf forwarder modules, and intermediate forwarder modules,
    wherein the plurality of leaf nodes are divided into N groups, each group having the same number of leaf nodes, wherein leaf nodes in each group are connected to the leaf forwarder module in the respective group and leaf forwarder modules are connected to the central forwarder module via intermediate forwarder modules so that the central node is in communication connection with each group of leaf nodes by means of the forwarder modules individually, wherein the communication structure is a fractal-tree structure, and wherein the communication structure constituted by each group of leaf nodes and the respective leaf forwarder module has similarity with the communication structure constituted by the leaf forwarder modules and the respective intermediate forwarder module, and with the communication structure constituted by the intermediate forwarder modules and the central forwarder module,
    the communication method comprising broadcasting or multicasting communication data to the plurality of leaf nodes by means of the central node, receiving the communication data in the network-on-chip by the plurality of leaf nodes and transmitting the received communication data to the central node, wherein:
        when the central node multicasts communication data to the plurality of leaf nodes, firstly inputting the communication data into a data cache of the central forwarder module corresponding to the central node, then transmitting the communication data in data caches of the intermediate forwarder modules sequentially, and finally inputting the communication data into data caches of the leaf forwarder modules in direct connection with the leaf nodes, wherein the leaf forwarder modules shift the communication data in the data cache by means of shifters, distribute communication data with a preset bandwidth to each of leaf nodes so that only a certain preset bit range within the communication data is used, and output the communication data to the leaf nodes in each group of leaf nodes via output ports of the leaf forwarder modules, or when the plurality of leaf nodes transmit communication data to the central node, if the leaf nodes transmit full bandwidth communication data, firstly inputting the communication data into data caches of the leaf forwarder modules corresponding to the respective leaf nodes, then transmitting the communication data in data caches of the intermediate forwarder modules sequentially, and finally inputting the communication data into a data cache of the central forwarder module corresponding to the central node, wherein the central forwarder module sums up all received data transmitted from the leaf nodes by means of an adder, and outputs a result to the central node via output port of the central forwarder module, or when the plurality of leaf nodes transmit communication data to the central node, if the leaf nodes transmit communication data with respective preset bandwidth, firstly inputting the communication data into data caches of the leaf forwarder modules corresponding to the respective leaf nodes, then transmittinq the communication data in data caches of the intermediate forwarder modules sequentially, and finally inputting the communication data into a data cache of the central forwarder module corresponding to the central node, wherein the central forwarder module shifts all received communication data transmitted from the leaf nodes by means of shifters according to a position of the preset bandwidth in full bandwidth, sums up all received communication data transmitted from the leaf nodes by means of an adder, and outputs a result to the central node via output port of the central forwarder module.

4. The communication method for a network-on-chip according to claim 3, comprising:

when communication data is broadcasted from the central node to the plurality of leaf nodes, firstly inputting the communication data into a data cache of the central forwarder module corresponding to the central node, then transmitting the communication data in data caches of the intermediate forwarder modules sequentially, and finally inputting the communication data into data caches of the leaf forwarder modules corresponding to the respective leaf nodes, wherein the leaf forwarder modules output the communication data to the leaf nodes in each group of leaf nodes via output ports.

5. The communication method for a network-on-chip according to claim 3, comprising:

in the case that the leaf nodes transmit communication data with respective preset bandwidth when the plurality of leaf nodes transmit communication data to the central node, after the central forwarder module shifts all received communication data transmitted from the leaf nodes by means of shifters according to a position of the preset bandwidth in full bandwidth, setting data beyond the preset bandwidth of the communication data transmitted from each of the leaf nodes to be 0 by means of fixed logic units in the central forwarder module, to execute subsequent summation operation.

6. A communication method for a fractal-tree communication structure for network-on-chip, the fractal-tree communication structure comprising:

a central node that is a communication data center of the network-on-chip and used for broadcasting or multicasting communication data to a plurality of leaf nodes;

a plurality of leaf nodes that are communication data nodes of the network-on-chip and used for transmitting the communication data to a central node; and forwarder modules forwarding the communication data, comprising a central forwarder module, leaf forwarder modules, and intermediate forwarder modules, wherein the plurality of leaf nodes are divided into N groups, each group having the same number of leaf nodes, wherein leaf nodes in each group are connected to the leaf forwarder module in the respective group and leaf forwarder modules are connected to the central forwarder module via intermediate forwarder modules so that the central node is in communication connection with each group of leaf nodes by means of the forwarder modules individually, wherein the communication structure is a fractal-tree structure, and wherein the communication structure constituted by each group of leaf nodes and the respective leaf forwarder module has similarity with the communication structure constituted by the leaf forwarder modules and the respective intermediate forwarder module, and with the communication structure constituted by the intermediate forwarder modules and the central forwarder module;

under the circumstance of ensuring that the central node is in communication connection with each group of the leaf nodes individually, the number of the forwarder modules is decreased, such that a sharing degree of the forwarder modules is maximized;

the communication method comprising broadcasting or multicasting communication data to the plurality of leaf nodes by means of the central node, receiving the communication data in the network-on-chip by the plurality of leaf nodes and transmitting the received communication data to the central node, wherein:

when the central node multicasts communication data to the plurality of leaf nodes, firstly inputtinq the communication data into a data cache of the central forwarder module corresponding to the central node, then transmitting the communication data in data caches of the intermediate forwarder modules sequentially, and finally inputting the communication data into data caches of the leaf forwarder modules in direct connection with the leaf nodes, wherein the leaf forwarder modules shift the communication data in the data cache by means of shifters, distribute communication data with a preset bandwidth to each of leaf nodes, and output the communication data to the leaf nodes in each group of leaf nodes via output ports of the leaf forwarder modules, or when the plurality of leaf nodes transmit communication data to the central node, if the leaf nodes transmit full bandwidth communication data, firstly inputting the communication data into data caches of the leaf forwarder modules corresponding to the respective leaf nodes, then transmitting the communication data in data caches of the intermediate forwarder modules sequentially, and finally inputting the communication data into a data cache of the central forwarder module corresponding to the central node, wherein the central forwarder module sums up all received data transmitted from the leaf nodes by means of an adder, and outputs a result to the central node via output port of the central forwarder module, or when the plurality of leaf nodes transmit communication data to the central node, if the leaf nodes transmit communication data with respective preset bandwidth, firstly inputting the communication data into data caches of the leaf forwarder modules corresponding to the respective leaf nodes, then transmitting the communication data in data caches of the intermediate forwarder modules sequentially, and finally inputting the communication data into a data cache of the central forwarder module corresponding to the central node, wherein the central forwarder module shifts all received communication data transmitted from the leaf nodes by means of shifters according to a position of the preset bandwidth in full bandwidth, sums up all received communication data transmitted from the leaf nodes by means of an adder, and outputs a result to the central node via output port of the central forwarder module.

7. The communication method for a network-on-chip according to claim 6, comprising:

when communication data is broadcasted from the central node to the plurality of leaf nodes, firstly inputting the communication data into a data cache of the central forwarder module corresponding to the central node, then transmitting the communication data in data caches of the intermediate forwarder modules sequentially, and finally inputting the communication data into data caches of the leaf forwarder modules corresponding to the respective leaf nodes, wherein the leaf forwarder modules output the communication data to the leaf nodes in each group of leaf nodes via output ports.

8. The communication method for a network-on-chip according to claim 6, comprising:

in the case that the leaf nodes transmit communication data with respective preset bandwidth when the plurality of leaf nodes transmit communication data to the central node, after the central forwarder module shifts all received communication data transmitted from the leaf nodes by means of shifters according to a position of the preset bandwidth in full bandwidth, setting data beyond the preset bandwidth of the communication data transmitted from each of the leaf nodes to be 0 by means of fixed logic units in the central forwarder module, to execute subsequent summation operation.

9. A control apparatus comprising a fractal-tree communication structure for network-on-chip, the fractal-tree communication structure comprising:

a central node that is a communication data center of the network-on-chip and used for broadcasting or multicasting communication data to a plurality of leaf nodes;

a plurality of leaf nodes that are communication data nodes of the network-on-chip and used for transmitting the communication data to a central node; and forwarder modules for forwarding the communication data, comprising a central forwarder module, leaf forwarder modules, and intermediate forwarder modules, wherein the plurality of leaf nodes are divided into N groups, each group having the same number of leaf nodes, wherein leaf nodes in each group are connected to the leaf forwarder module in the respective group and leaf forwarder modules are connected to the central forwarder module via intermediate forwarder modules so that the central node is in communication connection with each group of leaf nodes by means of the forwarder modules individually, wherein the communication structure is a fractal-tree structure, and wherein the communication structure constituted by each group of leaf nodes and the respective leaf forwarder module has similarity with the communication structure constituted by the leaf forwarder modules and the respective intermediate forwarder module, and with the communication structure constituted by the intermediate forwarder modules and the central forwarder module;

wherein the control apparatus comprises one or more communication structures connected by means of forwarder modules, wherein:

when the central node multicasts communication data to the plurality of leaf nodes, firstly inputting the communication data into a data cache of the central forwarder module corresponding to the central node, then transmitting the communication data in data caches of the intermediate forwarder modules sequentially, and finally inputting the communication data into data caches of the leaf forwarder modules in direct connection with the leaf nodes, wherein the leaf forwarder modules shift the communication data in the data cache by means of shifters, distribute communication data with a preset bandwidth to each of leaf nodes so that only a certain preset bit range within the communication data is used, and output the communication data to the leaf nodes in each group of leaf nodes via output ports of the leaf forwarder modules, or when the plurality of leaf nodes transmit communication data to the central node, if the leaf nodes transmit full bandwidth communication data, firstly inputting the communication data into data caches of the leaf forwarder modules corresponding to the respective leaf nodes, then transmitting the communication data in data caches of the intermediate forwarder modules sequentially, and finally inputting the communication data into a data cache of the central forwarder module corresponding to the central node, wherein the central forwarder module sums up all received data transmitted from the leaf nodes by means of an adder, and outputs a result to the central node via output port of the central forwarder module, or when the plurality of leaf nodes transmit communication data to the central node, if the leaf nodes transmit communication data with respective preset bandwidth, firstly inputting the communication data into data caches of the leaf forwarder modules corresponding to the respective leaf nodes, then transmitting the communication data in data caches of the intermediate forwarder modules sequentially, and finally inputting the communication data into a data cache of the central forwarder module corresponding to the central node, wherein the central forwarder module shifts all received communication data transmitted from the leaf nodes by means of shifters according to a position of the preset bandwidth in full bandwidth, sums up all received communication data transmitted from the leaf nodes by means of an adder, and outputs a result to the central node via output port of the central forwarder module.

10. An intelligent chip comprising a control apparatus, the control apparatus comprising a fractal-tree communication structure for network-on-chip, the fractal-tree communication structure comprising:

a central node that is a communication data center of the network-on-chip and used for broadcasting or multicasting communication data to a plurality of leaf nodes;

a plurality of leaf nodes that are communication data nodes of the network-on-chip and used for transmitting the communication data to a central node; and forwarder modules forwarding the communication data, comprising a central forwarder module, leaf forwarder modules, and intermediate forwarder modules, wherein the plurality of leaf nodes are divided into N groups, each group having the same number of leaf nodes, wherein leaf nodes in each group are connected to the leaf forwarder module in the respective group and leaf forwarder modules are connected to the central forwarder module via intermediate forwarder modules so that the central node is in communication connection with each group of leaf nodes by means of the forwarder modules individually, wherein the communication structure is a fractal-tree structure, and wherein the communication structure constituted by each group of leaf nodes and the respective leaf forwarder module has similarity with the communication structure constituted by the leaf forwarder modules and the respective intermediate forwarder module, and with the communication structure constituted by the intermediate forwarder modules and the central forwarder module, wherein:

when the central node multicasts communication data to the plurality of leaf nodes, firstly inputting the communication data into a data cache of the central forwarder module corresponding to the central node, then transmitting the communication data in data caches of the intermediate forwarder modules sequentially, and finally inputting the communication data into data caches of the leaf forwarder modules in direct connection with the leaf nodes, wherein the leaf forwarder modules shift the communication data in the data cache by means of shifters, distribute communication data with a preset bandwidth to each of leaf nodes so that only a certain preset bit range within the communication data is used, and output the communication data to the leaf nodes in each group of leaf nodes via output ports of the leaf forwarder modules, or when the plurality of leaf nodes transmit communication data to the central node, if the leaf nodes transmit full bandwidth communication data, firstly inputting the communication data into data caches of the leaf forwarder modules corresponding to the respective leaf nodes, then transmitting the communication data in data caches of the intermediate forwarder modules sequentially, and finally inputting the communication data into a data cache of the central forwarder module corresponding to the central node, wherein the central forwarder module sums up all received data transmitted from the leaf nodes by means of an adder, and outputs a result to the central node via output port of the central forwarder module, or when the plurality of leaf nodes transmit communication data to the central node, if the leaf nodes transmit communication data with respective preset bandwidth, firstly inputting the communication data into data caches of the leaf forwarder modules corresponding to the respective leaf nodes, then transmitting the communication data in data caches of the intermediate forwarder modules sequentially, and finally inputting the communication data into a data cache of the central forwarder module corresponding to the central node, wherein the central forwarder module shifts all received communication data transmitted from the leaf nodes by means of shifters according to a position of the preset bandwidth in full bandwidth, sums up all received communication data transmitted from the leaf nodes by means of an adder, and outputs a result to the central node via output port of the central forwarder module.

* * * * *